United States Patent
Lee et al.

(10) Patent No.: US 11,349,317 B2
(45) Date of Patent: May 31, 2022

(54) CHARGER INTEGRATED CIRCUIT FOR CHARGING BATTERY DEVICE AND ELECTRONIC DEVICE INCLUDING THE CHARGER INTEGRATED CIRCUIT

(71) Applicant: SAMSUNG ELECTRONICS CO., LTD., Suwon-si (KR)

(72) Inventors: Sung-woo Lee, Hwaseong-si (KR); Sang-bin Moon, Seongnam-si (KR); Hyoung-seok Oh, Seoul (KR); Jung-wook Heo, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 353 days.

(21) Appl. No.: 16/539,541

(22) Filed: Aug. 13, 2019

(65) Prior Publication Data

US 2020/0144829 A1 May 7, 2020

(30) Foreign Application Priority Data

Nov. 7, 2018 (KR) .................. 10-2018-0136156
Jan. 18, 2019 (KR) .................. 10-2019-0006922

(51) Int. Cl.
*H02J 7/00* (2006.01)
*H02J 7/02* (2016.01)

(52) U.S. Cl.
CPC ............ *H02J 7/0014* (2013.01); *H02J 7/025* (2013.01)

(58) Field of Classification Search
CPC .................. H02J 7/0014; H02J 7/00
See application file for complete search history.

(56) References Cited

U.S. PATENT DOCUMENTS

| 8,179,101 | B2 | 5/2012 | Umetsu et al. | |
| 9,866,060 | B2 | 1/2018 | Kung et al. | |
| 2014/0232326 | A1* | 8/2014 | Wohltmann | H02J 7/0031 320/107 |
| 2014/0320067 | A1* | 10/2014 | Ling | H02J 7/0018 320/107 |
| 2016/0190830 | A1* | 6/2016 | Kuhlmann | H02J 7/00306 320/116 |
| 2018/0062402 | A1 | 3/2018 | Syouda | |
| 2018/0138735 | A1 | 5/2018 | Maalouf et al. | |
| 2018/0205252 | A1 | 7/2018 | Greening et al. | |
| 2019/0097434 | A1 | 3/2019 | Kim | |

FOREIGN PATENT DOCUMENTS

| JP | 2018-037392 A | 3/2018 |
| KR | 10-2018-0082345 A | 7/2018 |
| KR | 10-1878023 B1 | 7/2018 |

* cited by examiner

*Primary Examiner* — Robert Grant
(74) *Attorney, Agent, or Firm* — Lee IP Law, PC

(57) ABSTRACT

A charger integrated circuit for charging a battery device including a first battery and a second battery connected to each other in series. The charger integrated circuit includes a first charger to be connected to a connection node between the first and second batteries, a second charger to be connected between the input voltage terminal and a high voltage terminal of the battery device, and a balancing circuit to balance voltages of the first and second batteries. The first charger is to provide a first charge current to the connection node in a first charge mode. The second charger is to directly charge the battery device by providing a second charge current to the high voltage terminal in a second charge mode.

20 Claims, 25 Drawing Sheets

CHARGER INTEGRATED CIRCUIT FOR CHARGING BATTERY DEVICE AND ELECTRONIC DEVICE INCLUDING THE CHARGER INTEGRATED CIRCUIT

CROSS-REFERENCE TO RELATED APPLICATIONS

Korean Patent Application No. 10-2018-0136156, filed on Nov. 7, 2018, and Korean Patent Application No. 10-2019-0006922, filed on Jan. 18, 2019, in the Korean Intellectual Property Office, and entitled: "Charger Integrated Circuit for Charging Battery Device and Electronic Device Including the Charger Integrated Circuit," is incorporated by reference herein in its entirety.

BACKGROUND

1. Field

Embodiments relate to a charger, and more particularly, to a charger integrated circuit for charging a battery device including a plurality of batteries, and an electronic device including the charger integrated circuit.

2. Description of the Related Art

Portable electronic devices, e.g., mobile phones, include batteries. As the fifth generation (5G) era has arrived, power required by mobile phones has increased. Since a usage time of 5G mobile phones is reduced due to a limit of the current battery capacity, the demand for an increased capacity of the battery is increased, and at the same time, the importance of fast charging of the battery is also increased. Other applications are also demanding batteries having these attributes.

SUMMARY

According to an aspect, there is provided a charger integrated circuit (IC) for charging a battery device including a first battery and a second battery connected in series. The charger IC includes a first charger to be connected to a connection node between the first battery and the second battery, a second charger to be connected between the input voltage terminal and a high voltage terminal of the battery device, and a balancing circuit to be electrically connected to the battery device. The first charger provides a first charge current to the connection node using an input voltage received from an input voltage terminal in a first charge mode. The second charger directly charges the battery device by providing a second charge current to the high voltage terminal by using the input voltage received from the input voltage terminal in a second charge mode. The balancing circuit is to balance voltages of the first and second batteries.

According to another aspect, there is provided an electronic device including a charger integrated circuit (IC) to charge a battery device including a first battery and a second battery connected to each other in series, and at least one sense resistor arranged outside of the charger IC. The at least one sense resistor is connected in series to at least one of the first and second batteries. The charger IC includes a first charger to be connected to a connection node between the first battery and the second battery, the first charger to provide a first charge current to the connection node in a first charge mode, and a balancing circuit to be electrically connected to the battery device to balance voltages of the first and second batteries.

According to another aspect, there is provided an electronic device including a battery device including a first battery and a second battery connected in series, a connection node between the first battery and the second battery, and a high voltage terminal connected to the first battery, and a charger integrated circuit (IC) to charge the battery device. The charger IC includes a first charger to be connected to the connection node and a second charger to be connected to the high voltage terminal. The first charger is to provide a first charge current to the connection node in a first charge mode. The second charger is to directly charge the battery device by providing a second charge current to the high voltage terminal in a second charge mode.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
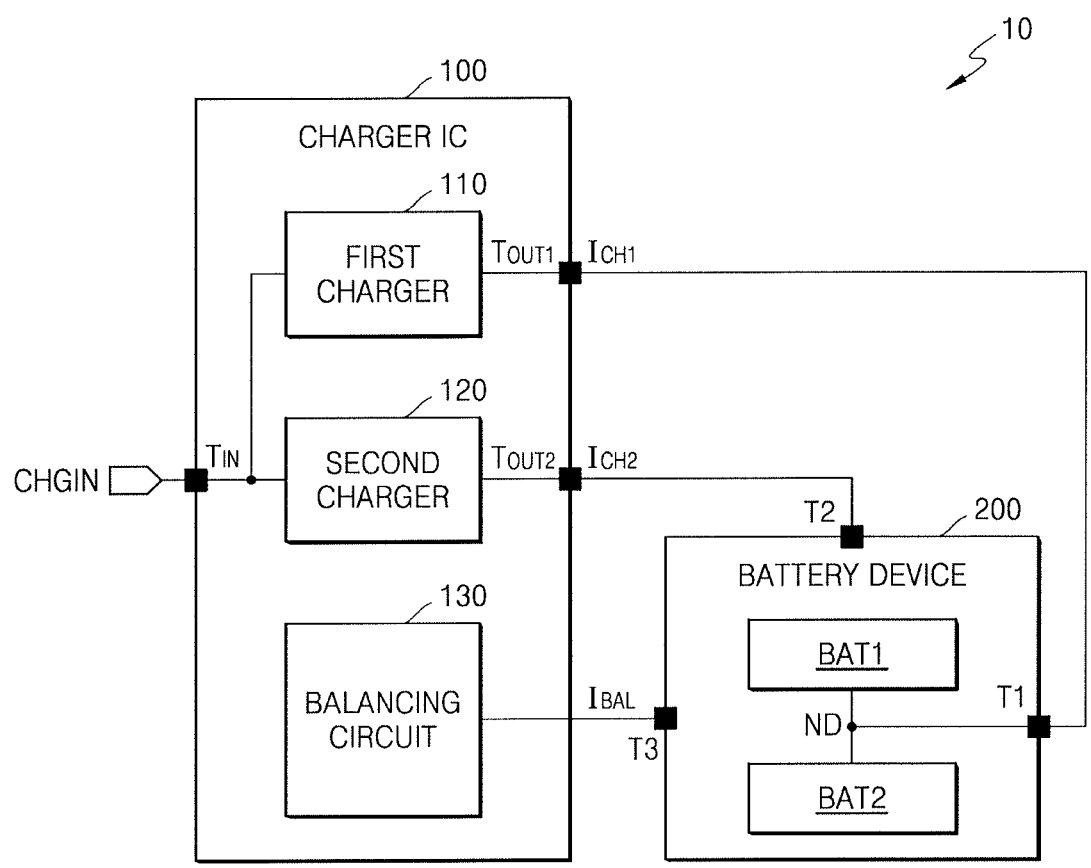
FIG. 1 illustrates an electronic device according to an embodiment.

FIG. 1 illustrates an electronic device 10 according to an embodiment. Referring to FIG. 1, the electronic device 10 may include a charger integrated circuit (IC) 100, which may be referred to as a "battery charger". For example, the charger IC 100 may be implemented as an IC chip and mounted on a printed circuit board. For example, the electronic device 10 may include any battery powered electronic device, e.g., a smart phone, a tablet personal computer (PC), a mobile phone, a personal digital assistant (PDA), a laptop, a wearable device, a global positioning system (GPS), an electronic book terminal, a digital broadcasting terminal, an MP3 player, a digital camera, an electric vehicle, and so forth.

In addition, the electronic device 10 may include a battery device 200. In an embodiment, the battery device 200 may be embedded in the electronic device 10. In an embodiment, the battery device 200 may be removable from the electronic device 10. The battery device 200 may include a first battery BAT1 and a second battery BAT2 connected to each other in series. The battery device 200 may further include a first terminal T1 connected to a connection node ND between the first battery BAT1 and the second battery BAT2. Accordingly, the first terminal T1 may be referred to as a "connection terminal" or "connection node". Hereinafter, the connection node and the connection terminal may substantially have the same meaning. In addition, the battery device 200 may further include a second terminal T2 connected to a positive terminal of the first battery BAT1. Accordingly, the second terminal T2 may be referred to as a "high voltage terminal". Furthermore, the battery device 200 may include a ground terminal connected to a negative terminal of the second battery BAT2. In some embodiments, the battery device 200 may include three or more batteries connected to each other in series.

In an embodiment, the first battery BAT1 may be a first battery cell, the second battery BAT2 may be a second battery cell, and the battery device 200 may be a multi-cell battery including a plurality of battery cells connected to each other in series. For example, the battery device 200 may be implemented as a battery pack. In an embodiment, the first battery BAT1 may be a first battery pack, the second battery BAT2 may be a second battery pack, and the battery device 200 may be implemented as a battery device including a plurality of battery cells connected to each other in series. In an embodiment, at least one of the first and second battery packs may be a multi-cell battery including a plurality of battery cells. In an embodiment, at least one of the first and second battery packs may be a single-cell battery including one battery cell.

The charger IC 100 may include a first charger 110, a second charger 120, and a balancing circuit 130, and may charge the battery device 200. In an embodiment, the first charger 110, the second charger 120, and the balancing circuit 130 may be implemented as a single IC. In some embodiments, at least one of the first charger 110, the second charger 120, and the balancing circuit 130 may be implemented as separate ICs. For example, the first and second chargers 110 and 120 may be implemented as a first IC, and the balancing circuit 130 may be implemented as a second IC.

In addition, the charger IC 100 may further include an input voltage terminal $T_{IN}$, a first output terminal $T_{OUT1}$, and a second output terminal $T_{OUT2}$. The input voltage terminal $T_{IN}$ may receive an input voltage CHGIN. In an embodiment, the input voltage terminal $T_{IN}$ may be electrically connected to an output terminal of a travel adapter (TA). The TA may convert the power supplied from a household power source, alternate current (AC) about 110 to about 220 V, or from another power source, e.g., a computer, a stand-alone charging station, and so forth, into direct current (DC) power required for battery charging and provide the DC power to the electronic device 10. In an embodiment, the input voltage terminal $T_{IN}$ may be electrically connected to an output terminal of an auxiliary battery. The charger IC 100 may charge the battery device 200 using the DC power received from the TA or the auxiliary battery.

The first charger 110 may be connected between the input voltage terminal $T_{IN}$ and the first output terminal $T_{OUT1}$, and the first output terminal $T_{OUT1}$ is electrically connected to the first terminal T1 of the battery device 200. The second charger 120 may be connected between the input voltage terminal $T_{IN}$ and the second output terminal $T_{OUT2}$, and the second output terminal $T_{OUT2}$ may be electrically connected to the second terminal T2 of the battery device 200. In an embodiment, when the input voltage CHGIN is received, the first charger 110 and the second charger 120 may be selectively operated. In some embodiments, when the input voltage CHGIN is received, the first charger 110 and the second charger 120 may be operated simultaneously.

The first charger 110 may receive the input voltage CHGIN from the input voltage terminal $T_{IN}$ and generate a first charge current Ion from the received input voltage CHGIN. The first charger 110 may provide the first charge current $I_{CH1}$ to the first terminal T1 of the battery device 200 via the first output terminal $T_{OUT1}$. For example, the first charger 110 may be a switching charger or a linear charger. In an embodiment, the first charger 110 may be activated in a first charge mode, e.g., a normal charge mode.

The second charger 120 may receive the input voltage CHGIN from the input voltage terminal $T_{IN}$ and generate a second charge current kHz from the received input voltage CHGIN. The second charger 120 may provide the second charge current $I_{CH2}$ to the second terminal T2 of the battery device 200 via the second output terminal $T_{OUT2}$. For example, the second charger 120 may be a direct charger. In an embodiment, the second charger 120 may be activated in a second charge mode, e.g., a fast charge mode or a high speed charge mode. Accordingly, the battery device 200 may be charged faster in the second charge mode than in the first charge mode.

The balancing circuit 130 may balance voltages of the first battery BAT1 and the second battery BAT2. The balancing circuit 130 may charge an undercharged battery by using the energy of an overcharged battery among the first and second batteries BAT1 and BAT2, and thus, the first and second batteries BAT1 and BAT2 may be balanced. The balancing circuit 130 may provide a balancing current $I_{BAL}$ to the battery device 200 to balance the voltage of the first battery BAT1 and the voltage of the second battery BAT2. In some embodiments, the battery device 200 may further include a third terminal T3, and the balancing circuit 130 may be connected to the battery device 200 via the third terminal T3. In an embodiment, the third terminal T3 may be electrically connected to the connection node ND.

In some embodiments, the balancing circuit 130 may be external to the charger IC 100. In an embodiment, the balancing circuit 130 and the battery device 200 may be implemented in one body. For example, the balancing circuit 130 may be implemented as a part of the battery device 200, i.e., the balancing circuit 130 may be an internal component of the battery device 200.

In some embodiments, the first battery BAT1 may be a first battery pack and the second battery BAT2 may be a second battery pack, and the first and second battery packs may be connected to each other in series. For example, at least one of the first and second battery packs may include the plurality of battery cells connected to in series. The first charger 110 may be connected to the connection node ND between the first battery pack and the second battery pack, and the second charger 120 may be connected to the high voltage terminal T2 of the battery device 200, e.g., to the positive terminal of the first battery pack. In this case, the balancing circuit 130 may balance the voltage of the first battery pack and the voltage of the second battery pack.

In some embodiments, the charger IC 100 may further include a circuit or a block which supports at least one of various functions, e.g., an under-voltage lockout (UVLO) function, an over-current protection (OCP) function, an over-voltage protection (OVP) function, a soft-start function to reduce inrush current, a foldback current limit function, a hiccup mode function for short circuit protection, an over-temperature protection (OTP) function, and so forth.

Figure 2:
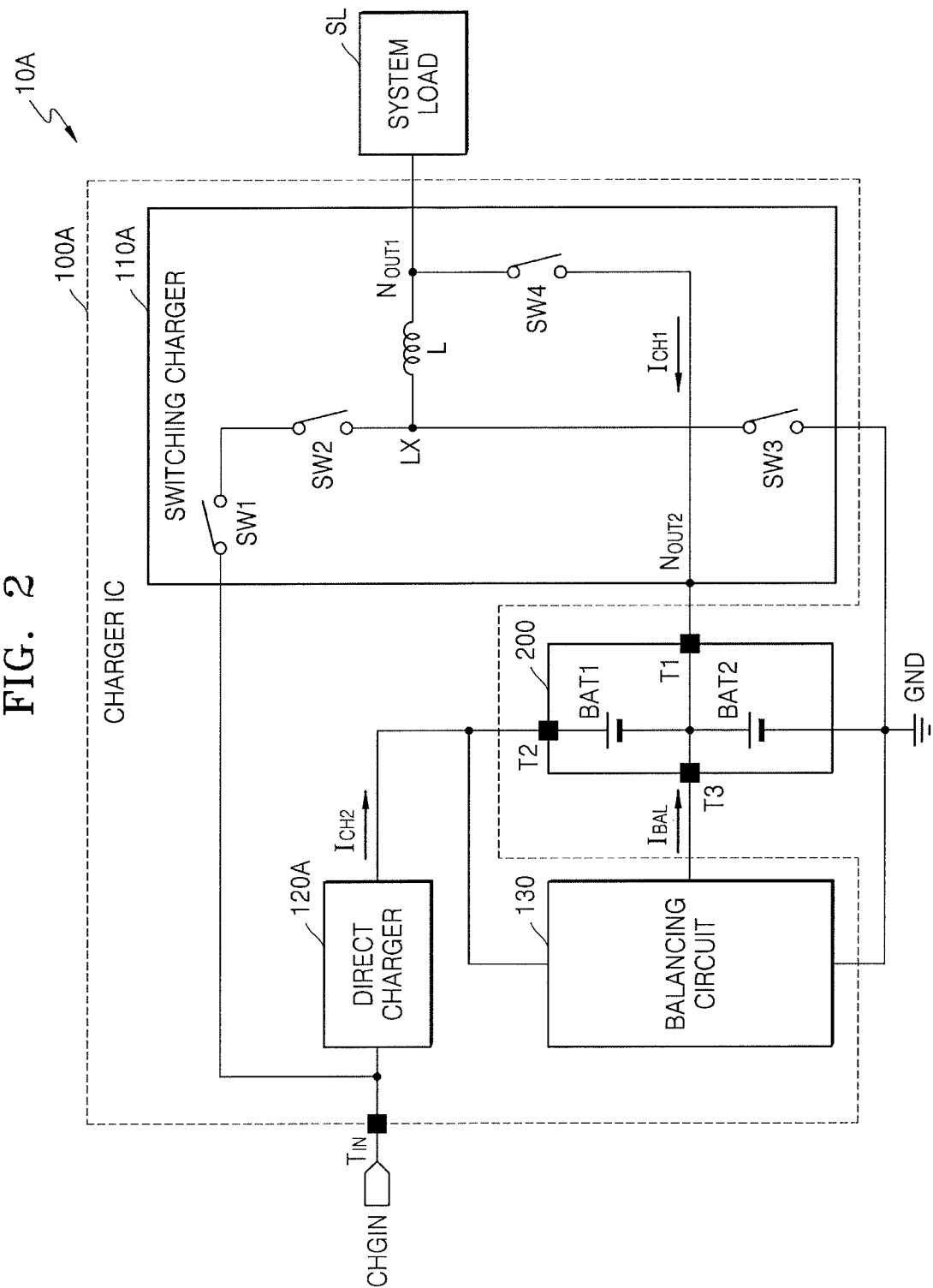
FIG. 2 illustrates an electronic device according to an embodiment.

FIG. 2 illustrates an electronic device 10A according to an embodiment. Referring to FIG. 2, the electronic device 10A may include a charger IC 100A, the battery device 200, and a system load SL. The charger IC 100A is one example of the charger IC 100 in FIG. 1. The system load SL may include chips or modules included in the electronic device 10A, e.g., a modem, an application processor, a memory, a display, and so forth. For example, the system load SL may include an operation block and a function block or an intellectual property (IP) block, e.g., a multimedia block in an application processor, a memory controller, etc., included in the electronic device 10A. The system load SL may also be referred to as a consumption block or a load.

The charger IC 100A may include a switching charger 110A, a direct charger 120A, and the balancing circuit 130. The switching charger 110A may include first through fourth switches SW1 through SW4 and an inductor L and is an example of the first charger 110 in FIG. 1. For example, the first through fourth switches SW1 through SW4 may be implemented as power switches. However, a structure of the switching charger 110A is not limited thereto, and according to embodiments, the number of switches or inductors included in the switching charger 110A may be variously changed. In addition, the switching charger 110A may further include a first output node $N_{OUT1}$ connected to the system load SL and a second output node $N_{OUT2}$ connected to the battery device 200. Accordingly, the switching charger 110A may be referred to as a "dual output charger".

The first and second switches SW1 and SW2 may be connected to each other in series between the input voltage terminal $T_{IN}$ and a switching node LX and may provide the input voltage CHGIN to the switching node LX. For example, the first switch SW1 may be turned on in the first charge mode. Accordingly, the first switch SW1 may be referred to as a "charge switch". The third switch SW3 may be connected between the switching node LX and a ground terminal GND and may provide a ground voltage to the switching node LX. The inductor L may be connected between the switching node LX and the first output node $N_{OUT1}$. The second and third switches SW2 and SW3 may be alternately turned on.

The fourth switch SW4 may be connected between the first output node $N_{OUT1}$ and the second output node $N_{OUT2}$. The fourth switch SW4 may be supplied with a voltage from the inductor L via the first output node $N_{OUT1}$ and may supply the voltage to the battery device 200 via the second output node $N_{OUT2}$. In an embodiment, when the fourth switch SW4 is turned on, the first charge current $I_{CH1}$ may be provided to the battery device 200 via the second output node $I_{OUT2}$. In addition, in an embodiment, when the fourth switch SW4 is turned on, a battery current may be supplied to the system load SL from the battery device 200 and may flow in a reverse direction of the first charge current $I_{CH1}$. Accordingly, the fourth switch SW4 may be referred to as a "battery switch".

The first through fourth switches SW1 through SW4 may be driven by a control logic. In an embodiment, the control logic may be implemented as a control logic 140 included in a charger IC 100' in FIG. 7. In an embodiment, the control logic may be implemented within a control block 160 included in an interface (IF)-power management IC (PMIC) (IF-PMIC) 500 in FIG. 19. In an embodiment, the control logic may be implemented within a PMIC 300 or an application processor (AP) 400 of FIG. 22.

The direct charger 120A is an example of the second charger 120 of FIG. 1. The direct charger 120A may be activated in the second charge mode to directly charge the battery device 200 by providing the second charge current $I_{CH1}$ to the second terminal T2 connected to the positive terminal of the first battery BAT1. The direct charger 120A may directly charge the battery device 200 in a direct charge method in which the input voltage CHGIN is directly connected to the battery device 200. A charge efficiency of the direct charge method may be higher than that of a switching charge method using the switching charger 110A.

The balancing circuit 130 may be connected to the second and third terminals T2 and T3 of the battery device 200 and the ground terminal GND. The balancing circuit 130 may adjust the voltage of the first battery BAT1 and the voltage of the second battery BAT2 to be identical by providing a balancing current IBAL to the third terminal T3. For example, when the voltage of the first battery BAT1 is greater than the voltage of the second battery BAT2, the balancing current $I_{BAL}$ may flow in a direction of an arrow illustrated in FIG. 2 such that energy of the first battery BAT1 is transferred to the second battery BAT2. In contrast, when the voltage of the first battery BAT1 is less than the voltage of the second battery BAT2, the balancing current $I_{BAL}$ may flow in a reverse direction of the arrow illustrated in FIG. 2 such that energy of the second battery BAT2 is transferred to the first battery BAT1.

Figure 3:
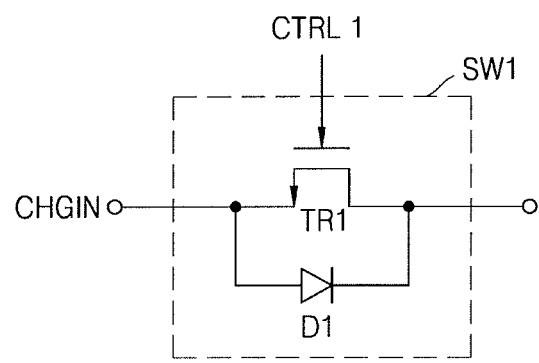
FIG. 3 illustrates an example circuit diagram of a first switch shown in FIG. 2.

FIG. 3 is an example circuit diagram illustrating the first switch SW1 illustrated in FIG. 2. Referring to FIG. 3, the first switch SW1 may include a transistor TR1 and a diode D1. The transistor TR1 may be an NMOS transistor driven by a control signal CTRL1. For example, the transistor TR1 may include a source receiving the input voltage CHGIN, a gate to which the control signal CTRL1 is applied, and a drain connected to the second switch SW2. However, the transistor TR1 may also be implemented as a PMOS transistor. The diode D1 may be a parasitic diode of the transistor TR1, and even when the first switch SW1 is turned off, the diode D1 may prevent an unintended leakage current from flowing in a direction of the input voltage terminal. The second through fourth switches SW2 through SW4 illustrated in FIG. 2 may be implemented similarly to the first switch SW1 illustrated in FIG. 3.

Figure 4:
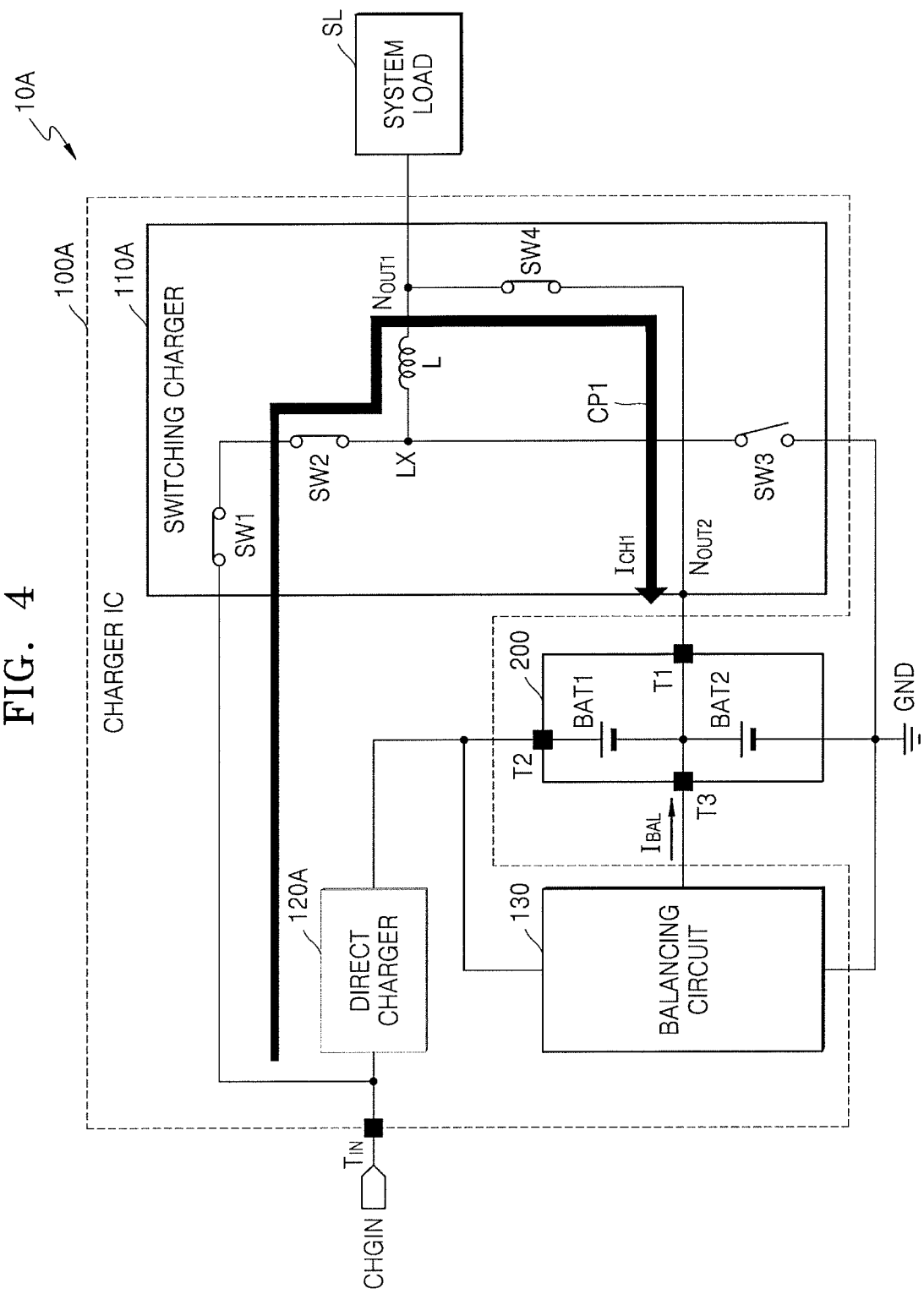
FIG. 4 illustrates a first charge mode of a charger integrated circuit (IC) according to an embodiment.

FIG. 4 illustrates the first charge mode of the electronic device 10A according to an embodiment. Referring to FIG. 4, in the first charge mode, the switching charger 110A may be activated, and the direct charger 120A may be deactivated. In the first charge mode, the first through fourth switches SW1 through SW4 may be selectively turned on to generate a first charge path CP1. The first charge current $I_{CH1}$ may be supplied to a connection node of the battery device 200, i.e., the first terminal T1 via the first charge path CP1. First charge power $P_{CH1}$ in the first charge mode may correspond to a product of the first charge current and a voltage $V_{BAT2}$ across the second battery BAT2 (that is, $P_{CH1}=I_{CH1}*V_{BAT2}$). The first charge current $I_{CH1}$ may be used to charge the second battery BAT2, and the balancing circuit 130 may balance the voltages of the first and second batteries BAT1 and BAT2 by using the balancing current $I_{BAL}$.

According to an embodiment, the first charge mode may be the normal charge mode. For example, in the first charge mode, the input voltage CHGIN may be a relatively low voltage. Alternatively, in the first charge mode, the input voltage CHGIN may be a high voltage. In the first charge mode, the switching charger 110A may be used to charge the battery device 200. Since the switching charger 110A is capable of stably supplying a system voltage $V_{SYS}$ regardless of a variation of the input voltage CHGIN provided from the TA, a compatibility difficulty due to the variation of the TA may be solved. However, when the charge current is large, a heat generation problem may occur due to a loss in the switching charger 110A.

Figure 5:
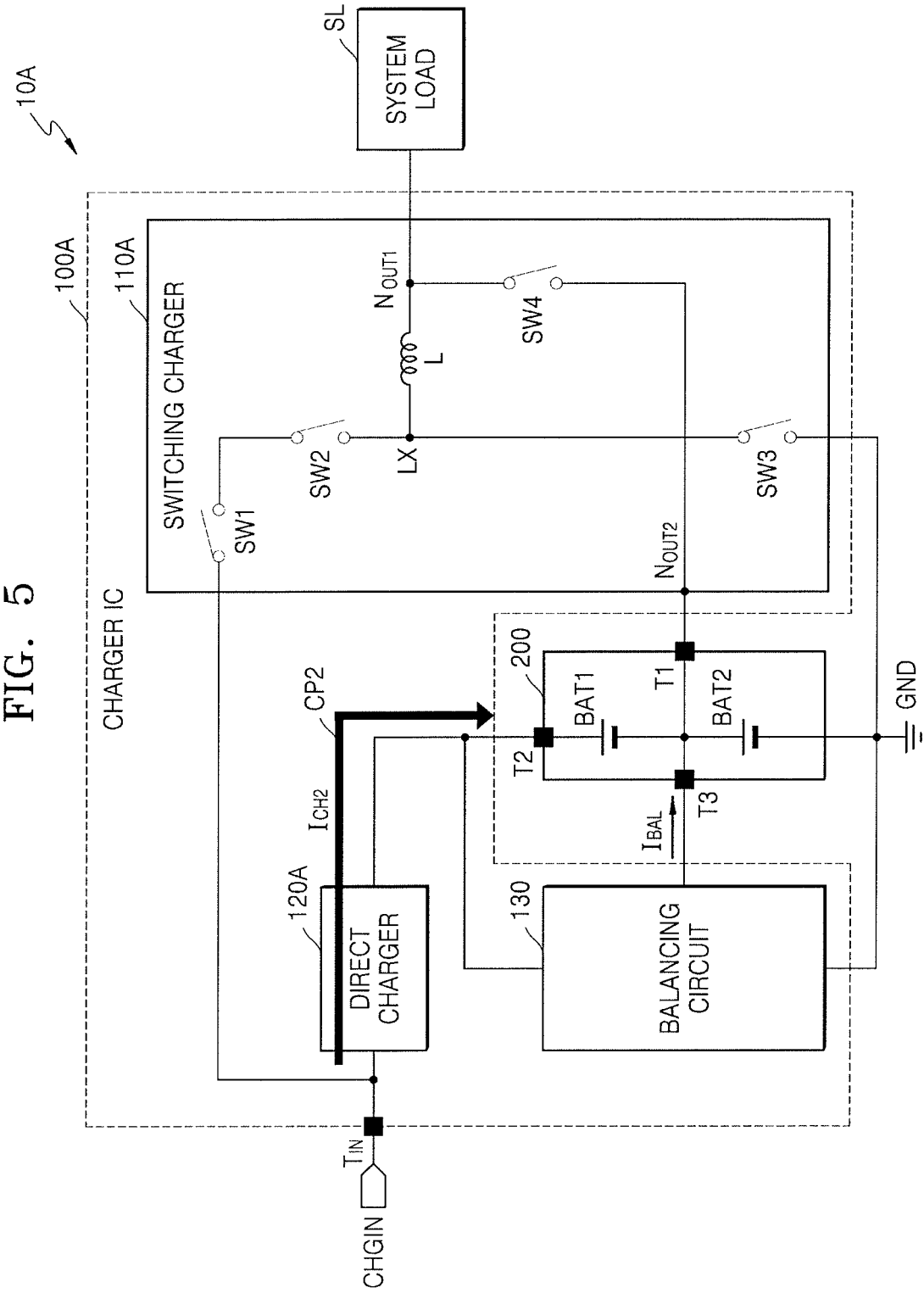
FIG. 5 illustrates a second charge mode of a charger IC according to an embodiment.

FIG. 5 illustrates the second charge mode of the charger IC 100A according to an embodiment. Referring to FIG. 5, in the second charge mode, the switching charger 110A may be deactivated, and the direct charger 120A may be activated. In the second charge mode, the first through fourth switches SW1 through SW4 may be turned off, and accordingly, a second charge path CP2 may be generated. The second charge current $I_{CH2}$ may be supplied to a high voltage terminal of the battery device 200, i.e., the second terminal T2 via the second charge path CP2. Second charge power $P_{CH2}$ in the second charge mode may correspond to a product of a sum of the voltage $V_{BAT1}$ of the first battery BAT1 and the voltage $V_{BAT2}$ of the second battery BAT2, and the second charge current $I_{CH2}$ (that is, $P_{CH2}=I_{CH2}*(V_{BAT1}+V_{BAT2})$). The second charge current $I_{CH2}$ may be used to charge the first and second batteries BAT1 and BAT2, and the balancing circuit 130 may balance the voltages of the first and second batteries BAT1 and BAT2 by using the balancing current $I_{BAL}$.

According to an embodiment, the second charge mode may be the high speed charge mode. For example, in the second charge mode, the input voltage CHGIN may be a higher voltage than in the first charge mode. Alternatively, in the second charge mode, the input voltage CHGIN may be a low voltage. In the second charge mode, the direct charger 120A may be used to charge the battery device 200 at a high speed. In the second charge mode, a voltage across the direct charger 120A may be reduced by controlling the input voltage CHGIN. As a result, since both power loss and heat generation are reduced, the charge efficiency may be relatively good when the battery device 200 is charged at a high speed through the direct charger 120A.

In some embodiments, both the switching charger 110A and the direct charger 120A may be activated in the second charge mode. In this case, the time required for charging the battery device 200 may be further reduced. In addition, in some embodiments, in the second charge mode, the direct charger 120A may charge the battery device 200, and the switching charger 110A may provide a system voltage (for example, $V_{SYS}$ in FIG. 13) to the system load SL. For example, by turning on the first switch SW1, controlling the second and third switches SW2 and SW3 to be on/off, and turning off the fourth switch SW4, the switching charger 110A may supply the system voltage $V_{SYS}$ to the system load SL in a buck mode. In addition, in some embodiments, in the second charge mode, the fourth switch SW4 may be turned on, and accordingly, a system voltage (for example, $V_{SYS}$ in GIS. 13) may be supplied to the system load SL from the battery device 200.

Figure 6:
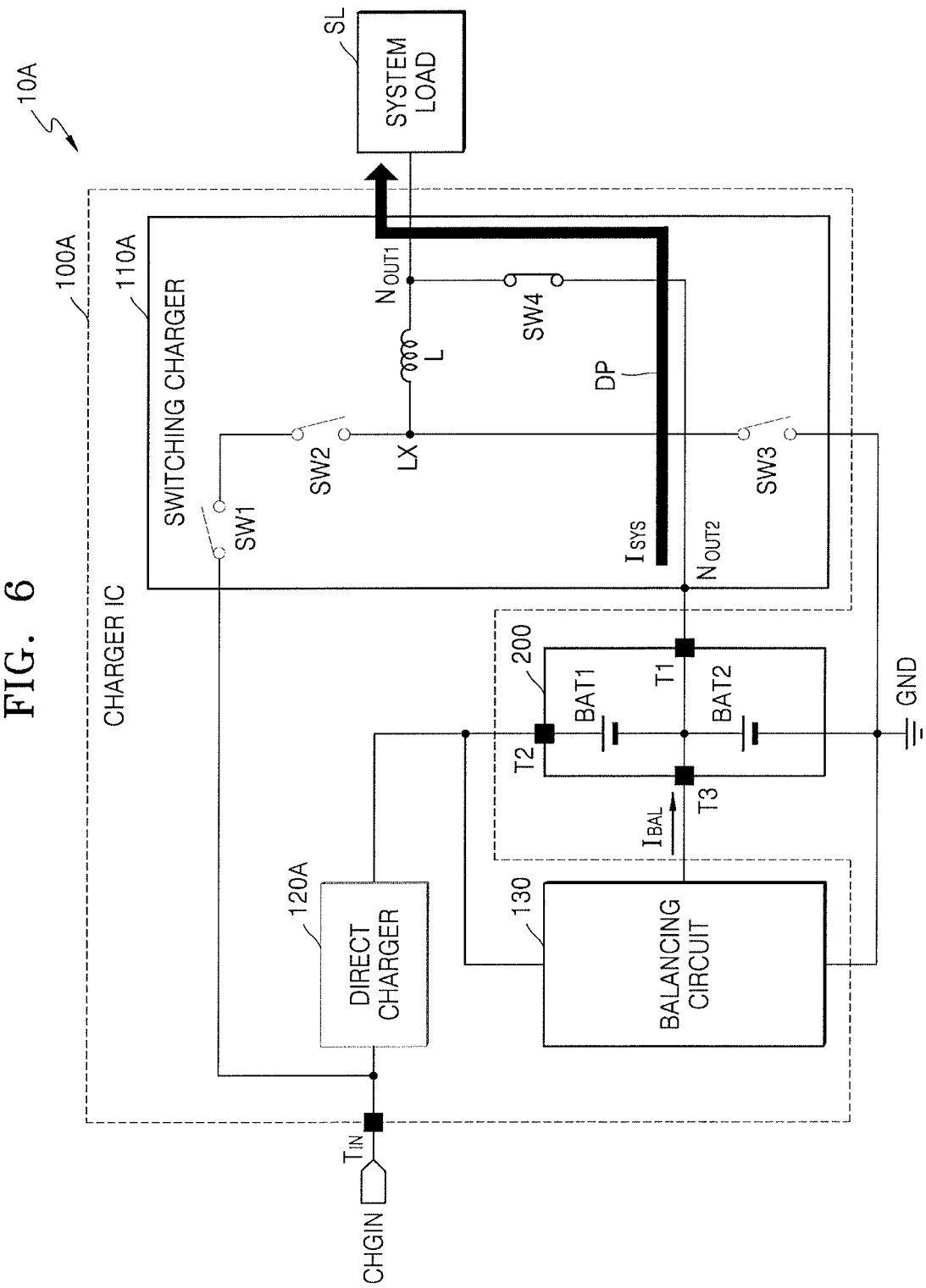
FIG. 6 illustrates a battery-only mode of a charger IC according to an embodiment.

FIG. 6 is a battery-only mode of a charger IC 100A according to an embodiment. Referring to FIG. 6, in the battery-only mode, both the switching charger 110A and the direct charger 120A may be deactivated. In the battery-only mode, the fourth switch SW4 may be turned on, and accordingly, a discharge path DP may be generated. The battery-only mode may be the case in which the power source is not connected, e.g., when the input voltage CHGIN is not applied. In the battery-only mode, an effective battery capacity may correspond to a sum of battery capacities of the first battery BAT1 and the second battery BAT2.

A system current $I_{SYS}$ may be supplied to the system load SL via the discharge path DP. The system current $I_{SYS}$ may be supplied from the voltage of the second battery BAT2, i.e., the battery voltage, and the balancing circuit 130 may charge the second battery BAT2 using the battery voltage from the first battery BAT1. In this case, since a system voltage $V_{SYS}$ is transferred to the system load SL via the fourth switch SW4, even when the voltage of the second battery BAT2, i.e., the battery voltage fluctuates, the system voltage $V_{SYS}$ may be stably delivered to the load SL. However, when the battery voltage of the battery device 200 is less than a certain voltage, the fourth switch SW4 may be turned off, and the discharge path DP may be disconnected.

In some embodiments, in the battery-only mode, only the fourth switch SW4 may be turned on, and the balancing circuit 130 may also be deactivated. Only the fourth switch SW4 included in the switching charger 110A may be turned on, and both the direct charger 120A and the balancing circuit 130 may be deactivated. Accordingly, of the first and second batteries BAT1 and BAT2, the system current $I_{SYS}$ may be supplied only by the second battery BAT2.

Figure 7:
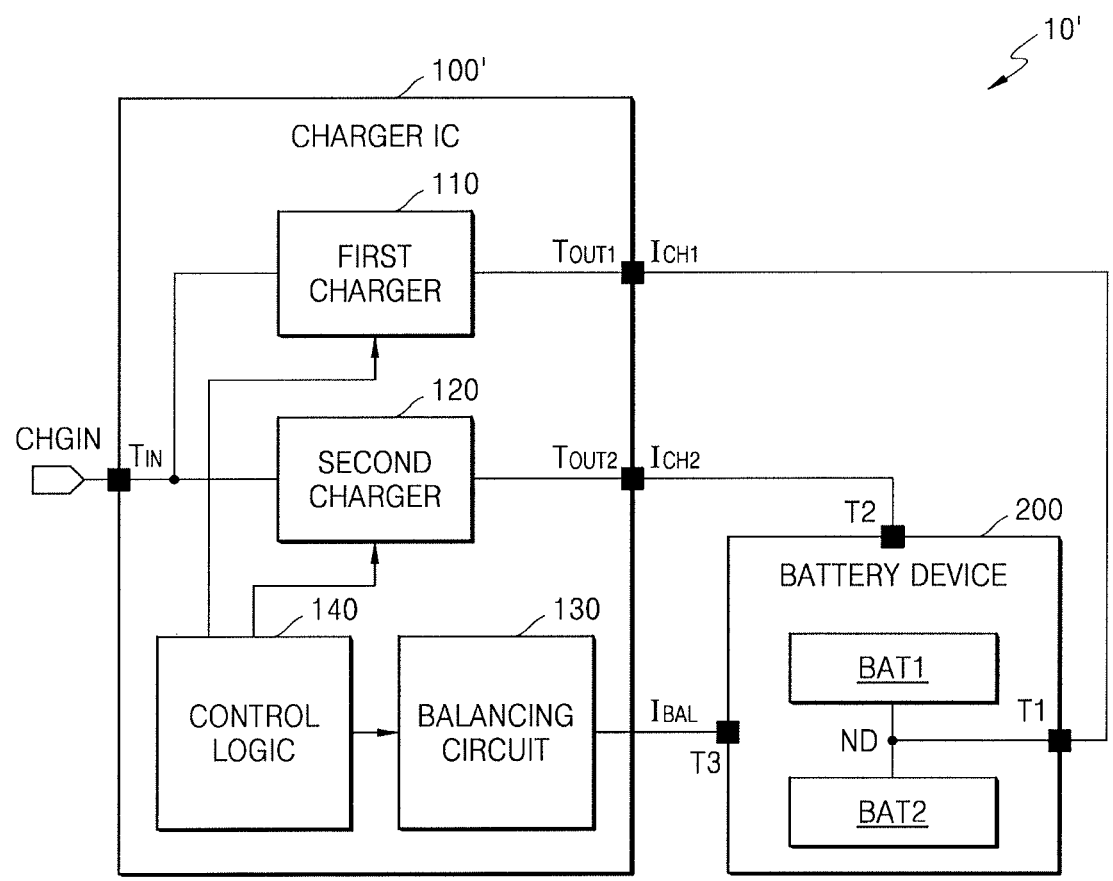
FIG. 7 illustrates a modified example of a charger IC according to an embodiment.

FIG. 7 illustrates a charger IC 100' according to an embodiment. Referring to FIG. 7, the electronic device 10' may include the charger IC 100' and the battery device 200. The charger IC 100' may correspond to a modified example of the charger IC 100 of FIG. 1 and may further include the control logic 140. Descriptions given with reference to FIGS. 1 through 6 may be applied to the present embodiment. The control logic 140 may control operations of the first and second chargers 110 and 120 and the balancing circuit 130. For example, the control logic 140 may control switches included in the first charger 110 and the second charger 120, and the balancing circuit 130 according to the first charge mode, the second charge mode, and a battery mode, respectively. In addition, the control logic 140 may control the voltage level of the input voltage CHGIN. For example, the control logic 140 may control the input voltage CHGIN such that the voltage level of the input voltage CHGIN in the second charge mode is greater than the voltage $V_{BAT1}$ across the first battery BAT1. For example, the control logic 140 may control the input voltage CHGIN such that the voltage level of the input voltage CHGIN in the second charge mode is greater than the voltage $V_{BAT2}$ across the second battery BAT2.

Figure 8:
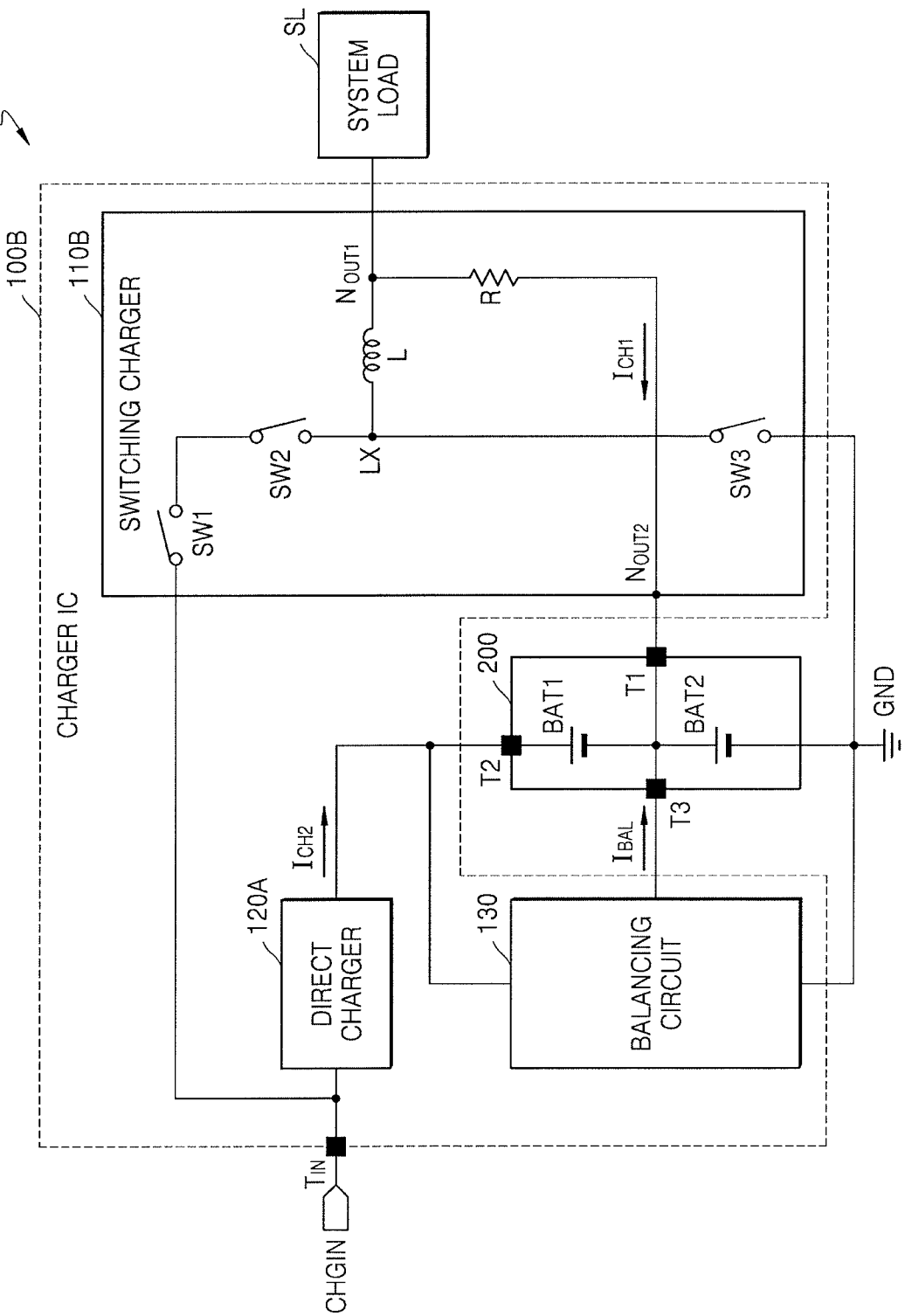
FIGS. 8 through 11 illustrate charger ICs according to embodiments. respectively.

FIG. 8 illustrates a charger IC 100B according to an embodiment. Referring to FIG. 8, a charger IC 100B may include a switching charger 110B, the direct charger 120A, and the balancing circuit 130. The charger IC 100B may correspond to a modified example of the charger IC 100A illustrated in FIG. 2, and the descriptions previously given with reference to FIGS. 1 through 7 may also be applied to the present embodiment. The switching charger 110B may include the first through third switches SW1 through SW3, the inductor L, and a resistor R. In this manner, the switching charger 110B may include the resistor R instead of the fourth switch SW4 included in the switching charger 110A of FIG. 2. Thus, even when the first through third switches SW1 through SW3 are turned off, the system load SL may receive from the battery device 200 a system voltage (for example, $V_{SYS}$ in FIG. 13) and a system current (for example, $I_{SYS}$ in FIG. 6).

However, the switching charger 110B may be implemented to include only the first through third switches SW1 through SW3 and the inductor L. In this case, the resistor R may be arranged outside the charger IC 100B, e.g., on a printed circuit board.

Figure 9:
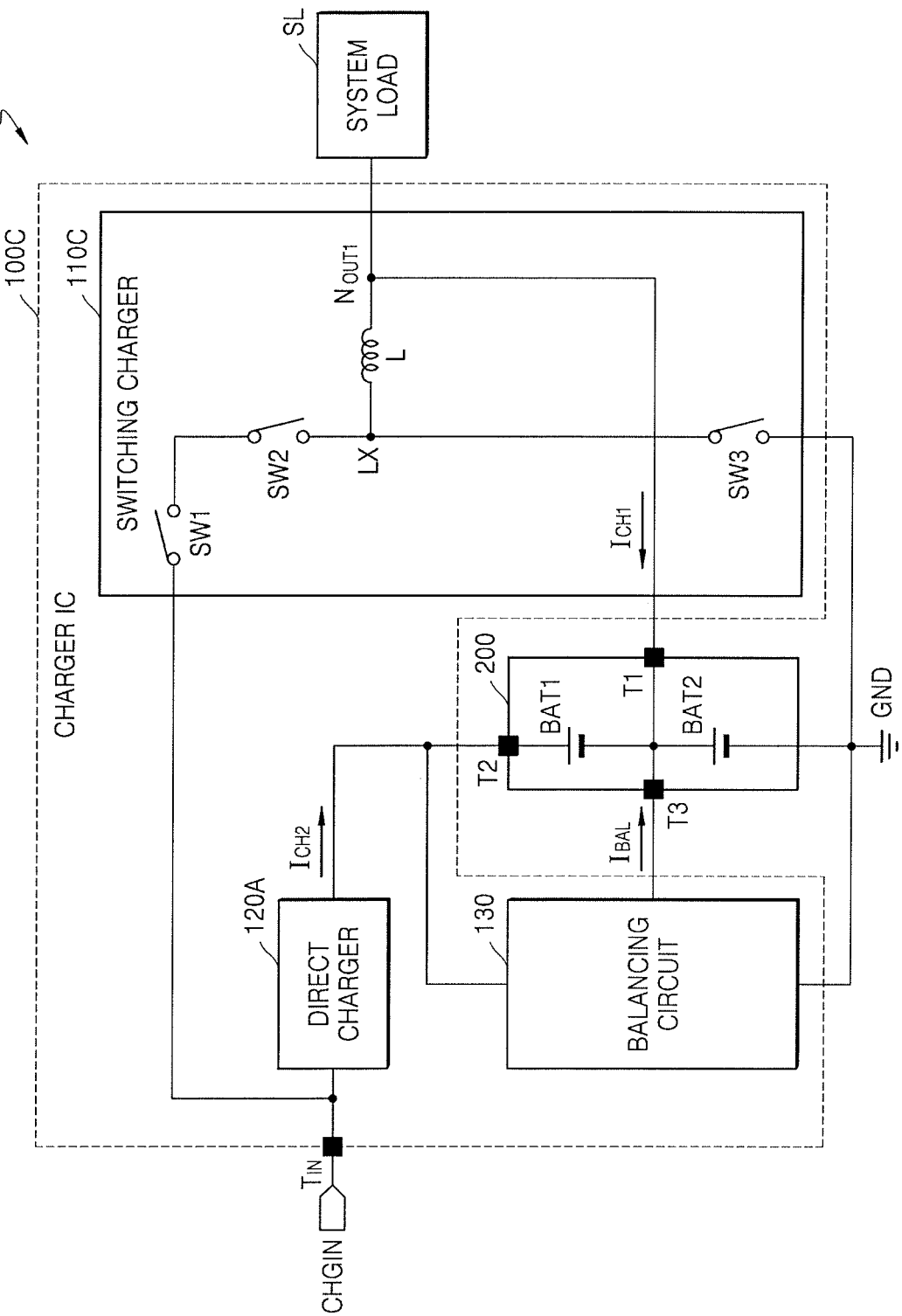

FIG. 9 illustrates a charger IC 100C according to an embodiment. Referring to FIG. 9, the charger IC 100C may include a switching charger 110C, the direct charger 120A, and the balancing circuit 130. The charger IC 100C may correspond to a modified example of the charger IC 100A illustrated in FIG. 2, and the descriptions previously given with reference to FIGS. 1 through 7 may also be applied to the present embodiment. The switching charger 110C may include the first through third switches SW1 through SW3 and the inductor L. The switching charger 110C may further include the first output node NOUT1 commonly connected to the system load SL and the battery device 200, and accordingly, the switching charger 110C may be referred to as a "single output charger".

Figure 10:
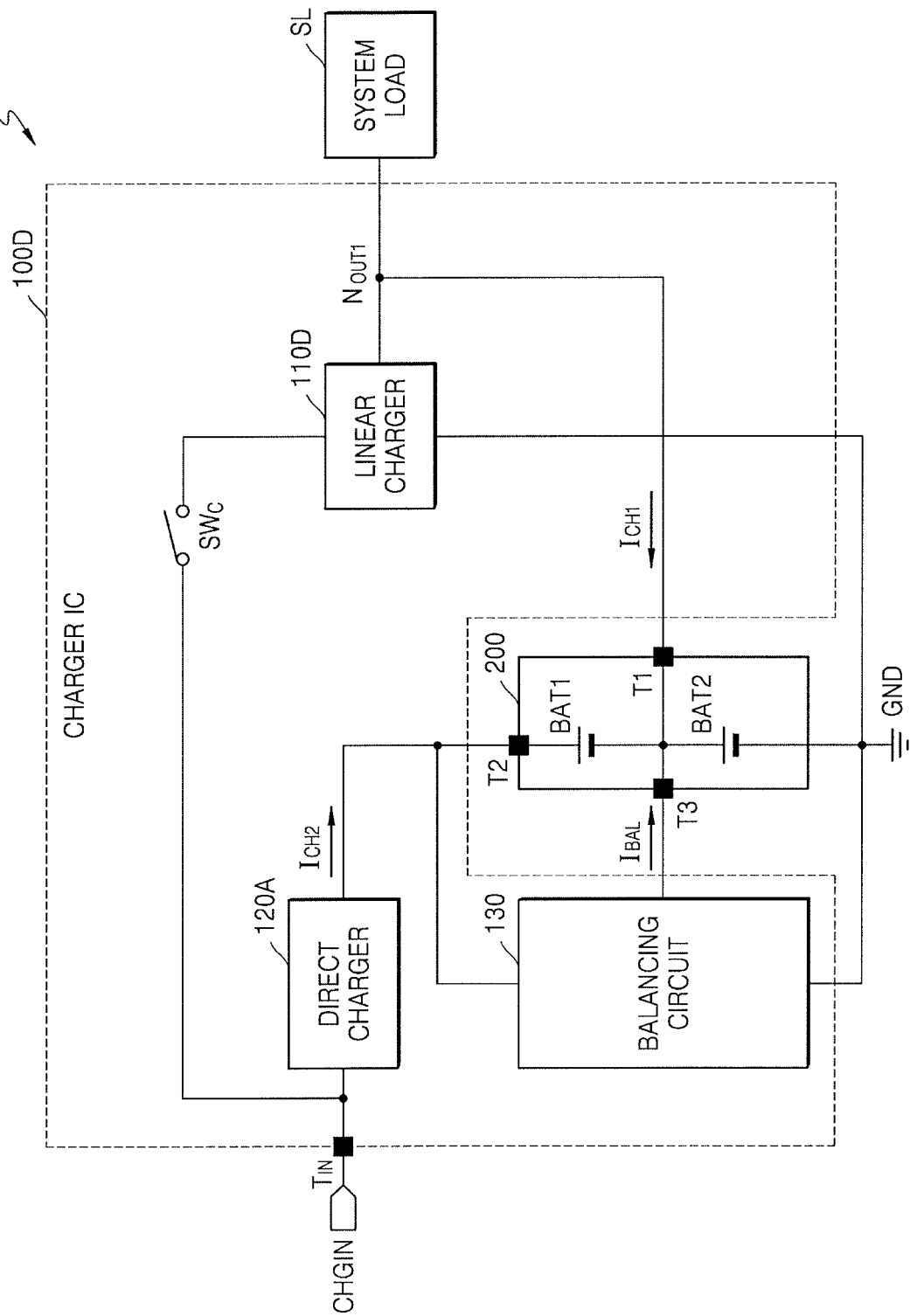

FIG. 10 illustrates a charger IC 100D according to an embodiment. Referring to FIG. 10, the charger IC 100D may include a linear charger 110D, the direct charger 120A, and the balancing circuit 130. The charger IC 100D may correspond to a modified example of the charger IC 100A illustrated in FIG. 2, and the descriptions previously given with reference to FIGS. 1 through 7 may also be applied to the present embodiment. According to the present embodiment, the charger IC 100D may further include a charge switch SWc. When the charge switch SWc is turned on, the linear charger 110D may provide the first charge current $I_{CH1}$ to the first terminal T1 of the battery device 200 via the first output node $N_{OUT1}$.

Figure 11:
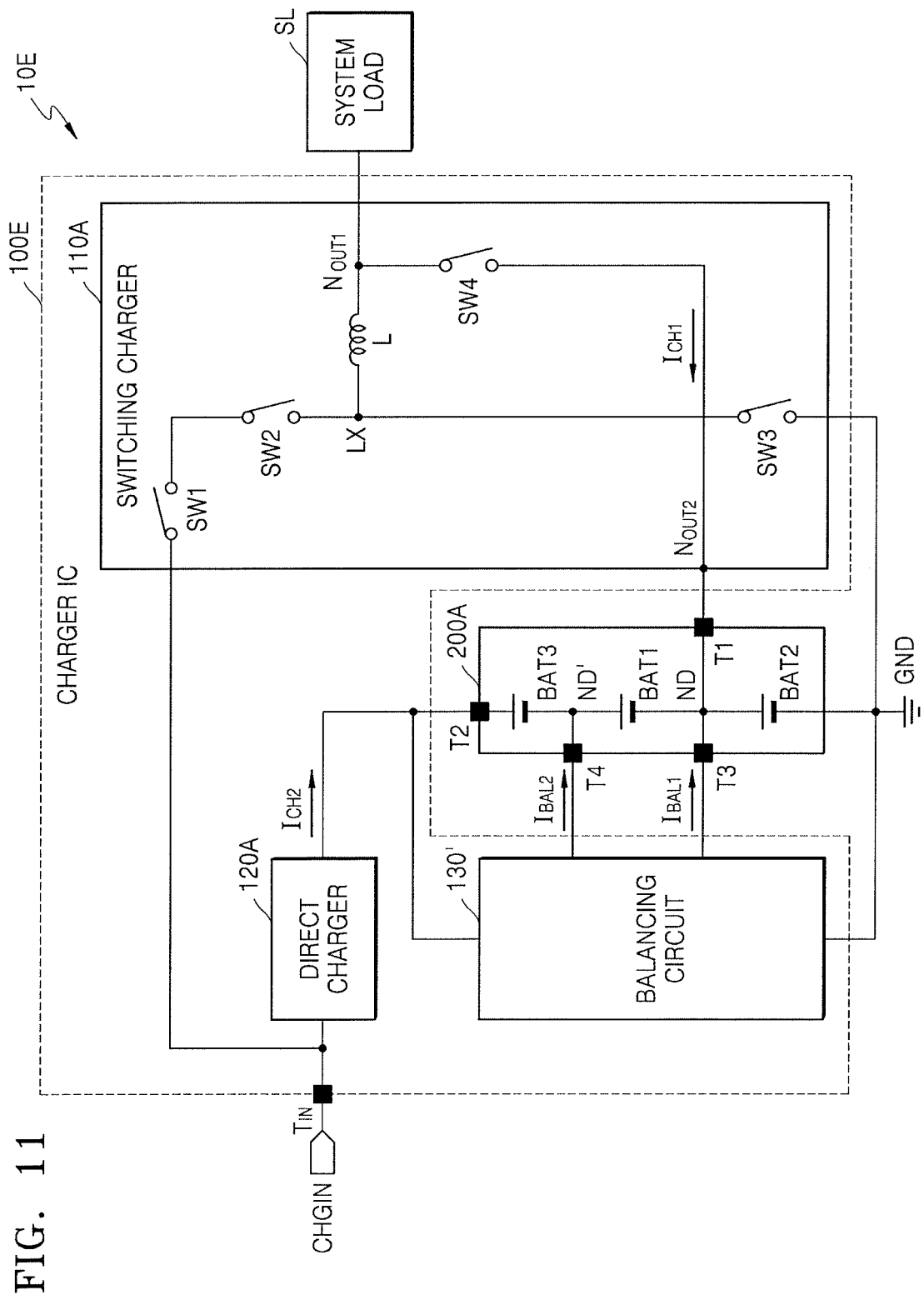

FIG. 11 illustrates a charger IC 100E according to an embodiment. Referring to FIG. 11, an electronic device 10E may include the charger IC 100E and a battery device 200A, and the battery device 200A may include first through third batteries BAT1 through BAT3 which are connected to each other in series. The battery device 200A may correspond to a modified example of the battery device 200 illustrated in FIG. 2 and may further include the third battery BAT3. The battery device may be implemented to include four or more batteries. A positive terminal of the third battery BAT3 may be electrically connected to the second terminal T2 corresponding to a high voltage terminal of the battery device 200A.

The charger IC 100E may include the switching charger 110A, the direct charger 120A, and a balancing circuit 130'. The balancing circuit 130' may be electrically connected to the first and second terminals T1 and T2, the ground terminal GND, and a connection node ND' between the third battery BAT3 and the first battery BAT1. Thus, the balancing circuit 130' may provide a first balancing current $I_{BAL1}$ to the connection node ND between the first and second batteries BAT1 and BAT2 and may provide a second balancing current $I_{BAL2}$ to the connection node ND' between the third and first batteries BAT3 and BAT1.

Figure 12A:
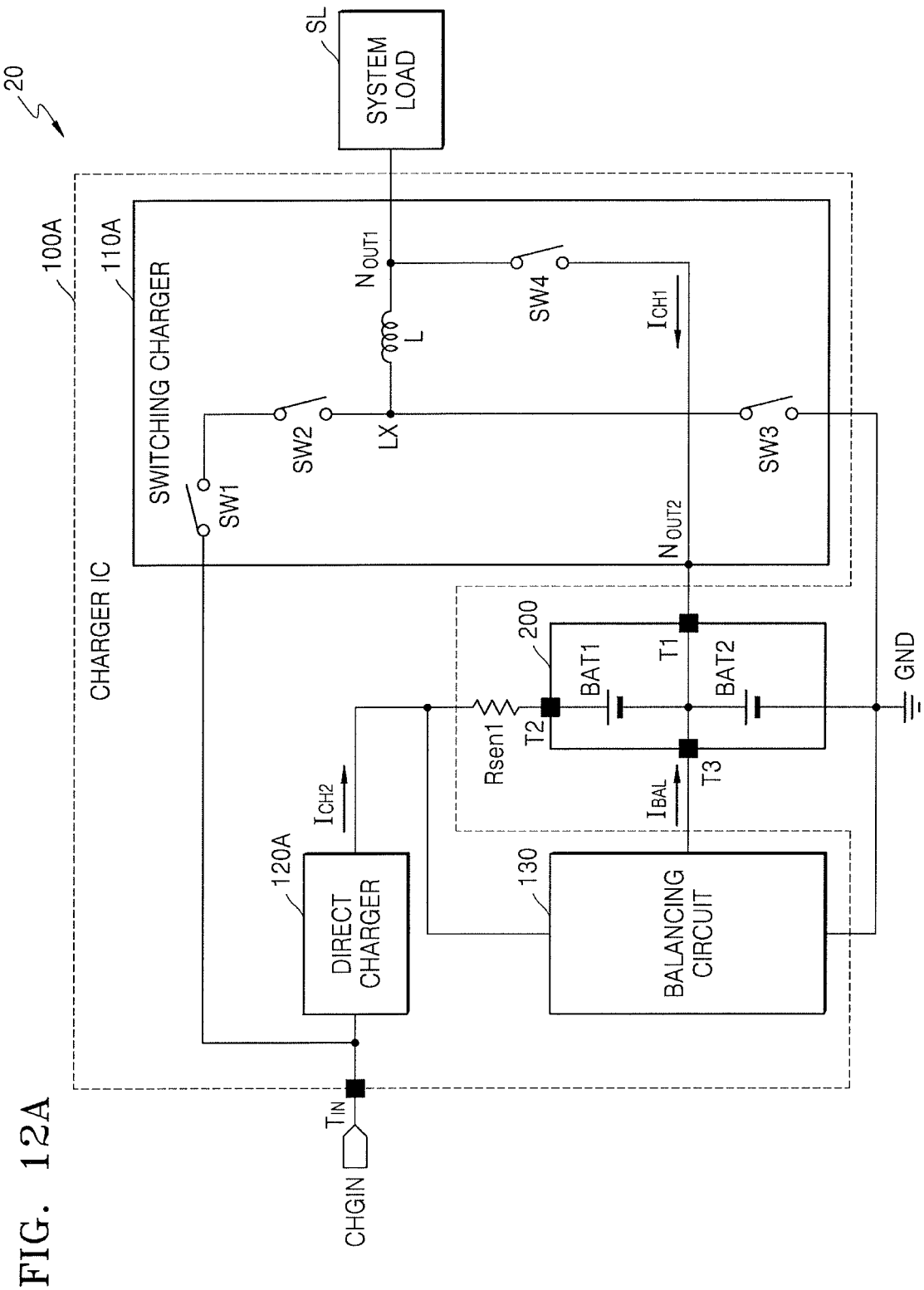
FIGS. 12A through 12C illustrate electronic devices according to embodiments, respectively.

FIG. 12A illustrates an electronic device 20 according to an embodiment. Referring to FIG. 12A, the electronic device 20 may include the charger IC 100A, the battery device 200, the system load SL, and a first sense resistor Rsen1. The first sense resistor Rsen1 may be connected between the direct charger 120A and the second terminal T2 of the battery device 200. In an embodiment, the first sense resistor Rsen1 may be on the printed circuit board and may be arranged outside the charger IC 100A. However, in some embodiments, the first sense resistor Rsen1 may be inside the charger IC 100A.

In an embodiment, the first sense resistor Rsen1 may monitor the first battery current flowing in the first battery BAT1 by sensing a current flowing through the first sense resistor Rsen1. For example, a battery gauge (for example, 170 in FIG. 19) may be connected to the first sense resistor Rsen1, and accordingly, the first battery current flowing in the first battery BAT1 may be monitored. The electronic device 20 may control the operation of the charger IC 100A based on the first battery current.

Figure 12B:
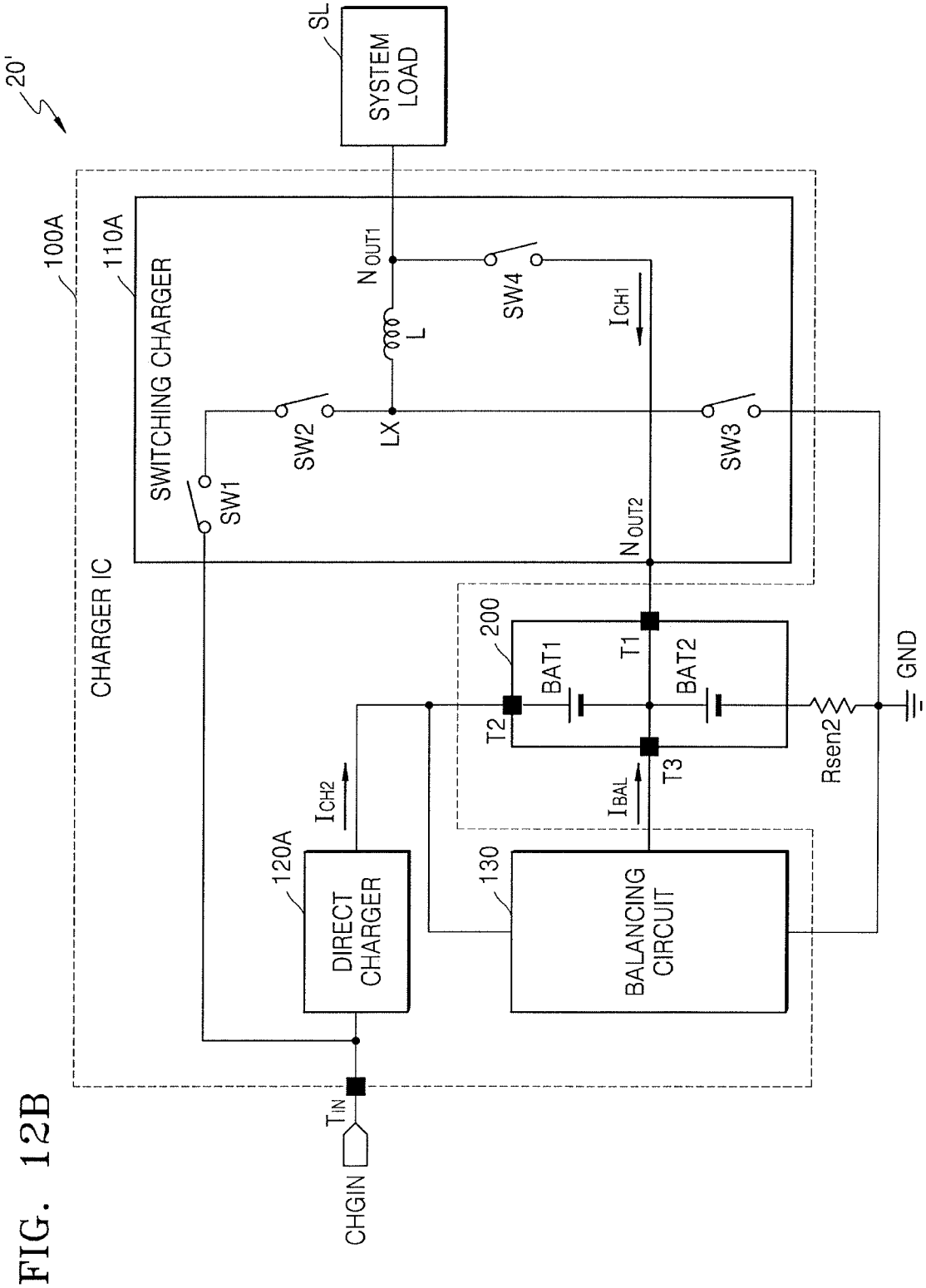

FIG. 12B illustrates an electronic device 20' according to an embodiment. Referring to FIG. 12B, the electronic device 20' may include the charger IC 100A, the battery device 200, the system load SL, and a second sense resistor Rsen2. The second sense resistor Rsen2 may be connected between the second terminal T2 of the battery device 200 and the ground terminal GND. In an embodiment, the second sense resistor Rsen2 may be on the printed circuit board and may be arranged outside the charger IC 100A. However, in some embodiments, the second sense resistor Rsen2 may be inside the charger IC 100A.

In an embodiment, the second sense resistor Rsen2 may monitor the second battery current flowing in the second battery BAT2 by sensing a current flowing through the second sense resistor Rsen2. For example, a battery gauge (for example, 170 in FIG. 19) may be connected to the second sense resistor Rsen2, and accordingly, the second battery current flowing in the second battery BAT2 may be monitored. The electronic device 20' may control the operation of the charger IC 100A based on the second battery current.

Figure 12C:
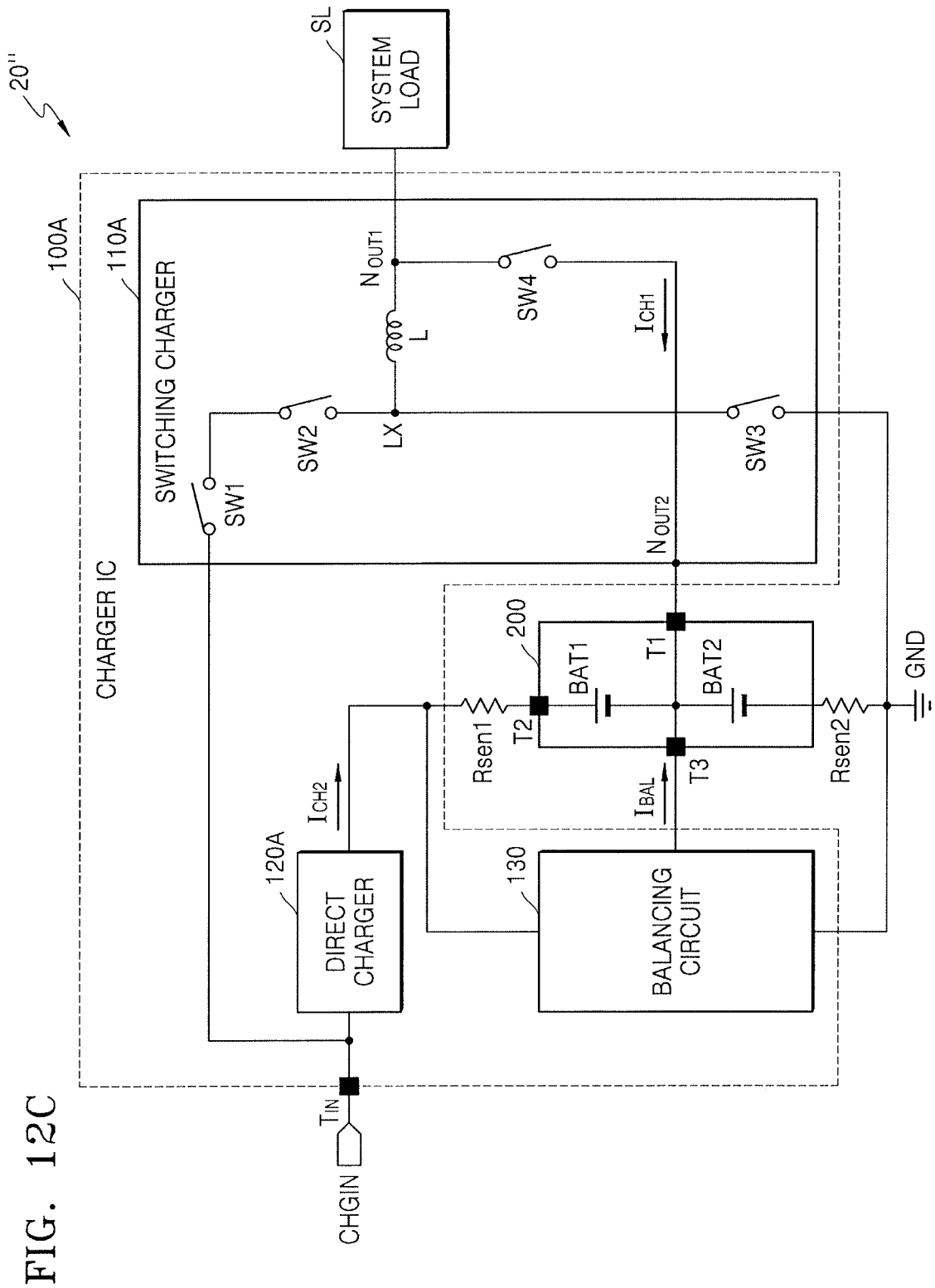

FIG. 12C illustrates an electronic device 20" according to an embodiment. Referring to FIG. 12C, the electronic device 20" may include the charger IC 100A, the battery device 200, the system load SL, and the first and second sense resistors Rsen1 and Rsen2. The first sense resistor Rsen1 may be connected between the direct charger 120A and the second terminal T2 of the battery device 200. The second sense resistor Rsen2 may be connected between the second terminal T2 of the battery device 200 and the ground terminal GND. In an embodiment, the first and second sense resistors Rsen1 and Rsen2 may be on the printed circuit board and may be arranged outside the charger IC 100A. However, in some embodiments, at least one of the first and second sense resistors Rsen1 and Rsen2 may be inside the charger IC 100A.

In an embodiment, the first sense resistor Rsen1 may monitor the first battery current flowing in the first battery BAT1 by sensing a current flowing through the first sense resistor Rsen1. For example, a battery gauge (for example, 170 in FIG. 19) may be connected to the first sense resistor Rsen1, and accordingly, the first battery current flowing in the first battery BAT1 may be monitored. In addition, in an embodiment, the second sense resistor Rsen2 may monitor the second battery current flowing in the second battery BAT2 by sensing a current flowing through the second sense resistor Rsen2. For example, a battery gauge (for example, 170 in FIG. 19) may be connected to the second sense resistor Rsen2, and accordingly, the second battery current flowing in the second battery BAT2 may be monitored. The electronic device 20" may control the operation of the charger IC 100A based on the first and second battery currents.

Figure 13:
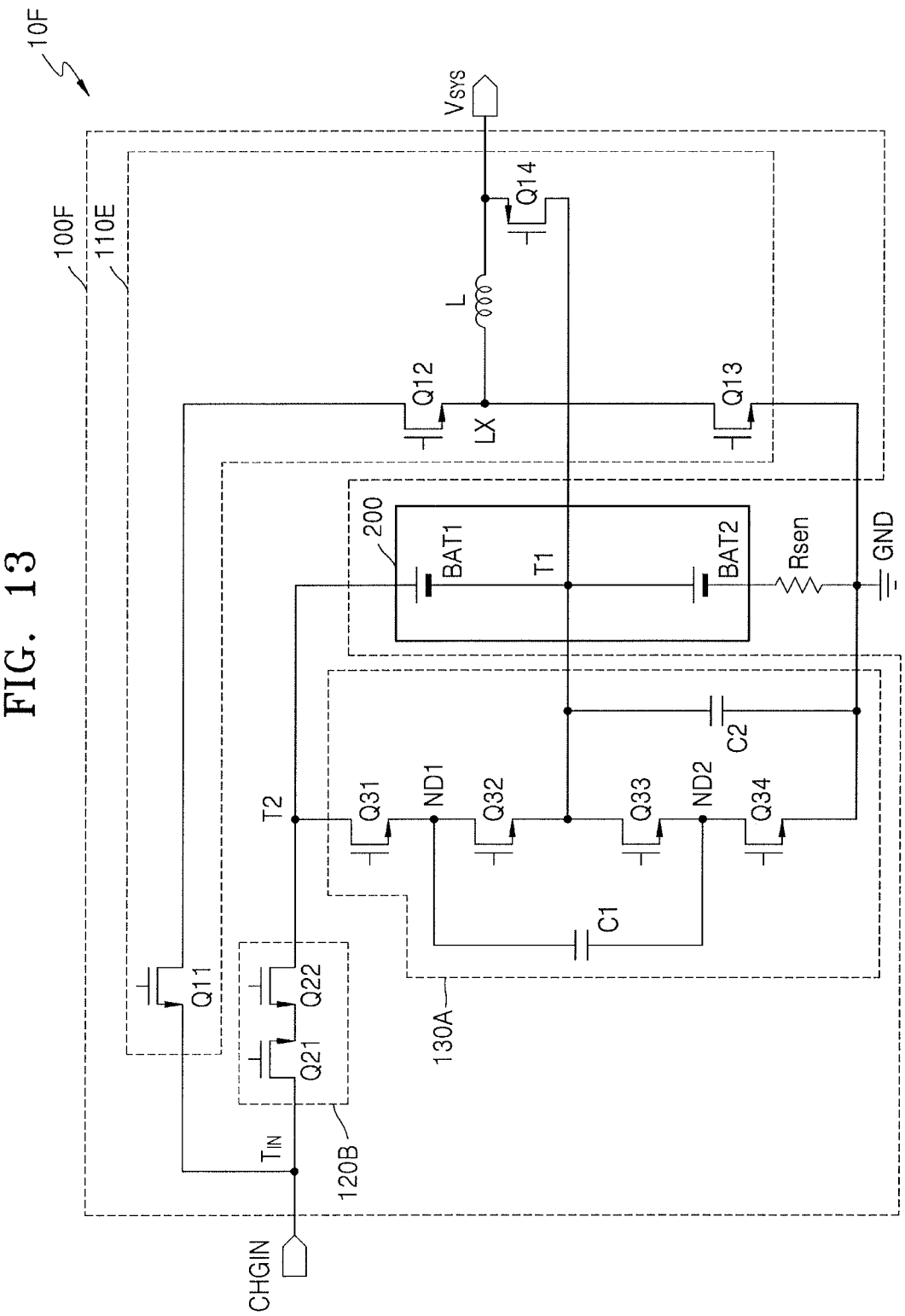
FIGS. 13 through 16 illustrate circuit diagrams of charger ICs according to embodiments, respectively.

FIG. 13 is a circuit diagram illustrating a charger IC 100F in an electronic device 10F according to an embodiment. Referring to FIG. 13, the charger IC 100F may include a switching charger 110E, a direct charger 120B, and a balancing circuit 130A. In an embodiment, the charger IC 100E may further include a sense resistor Rsen. According to embodiments, an arrangement of the sense resistors Rsen may be varied. The switching charger 110E may include first through fourth transistors Q11 through Q14 and the inductor L and may correspond to one embodiment of the switching charger 110A in FIG. 2. For example, the first through fourth transistors Q11 through Q14 may be implemented similarly to the first switch SW1 of FIG. 3. In the first charge mode, the first transistor Q11 may be turned on, and the second and third transistors Q12 and Q13 may be alternately turned on. The fourth transistor Q14 may be turned on in the first charge mode and the battery-only mode.

The direct charger 120B may include first and second transistors Q21 and Q22 and may correspond to one embodiment of the direct charger 120A in FIG. 2. For example, the first and second transistors Q21 and Q22 may be implemented similarly to the first switch SW1 of FIG. 3. However, in some embodiments, the direct charger 120a may include three or more transistors. In addition, in some embodiments, the direct charger 120a may include only the second transistor Q22.

The first and second transistors Q21 and Q22 may be connected to each other in series, a first end of the first transistor Q21 may be connected to the input voltage terminal $T_{IN}$, and a second end of the first transistor Q21 may be connected to the second transistor Q22. A first terminal of the second transistor Q22 may be connected to the first transistor Q21 and a second terminal of the second transistor Q22 may be connected to the second terminal T2 of the battery device 200. Thus, the first and second transistors Q21 and Q22 may provide the input voltage CHGIN to the high voltage terminal of the battery device 200. i.e., the second terminal T2.

The balancing circuit 130A may include first through fourth transistors Q31 through Q34, and a first capacitor C1 and a second capacitor C2. However, in some embodiments, the balancing circuit 130a may not include the second capacitor C2. The first through fourth transistors Q31 through Q34 may be connected in series between the second terminal T2 of the battery device 200 and the ground terminal GND. The first capacitor C1 may be connected between the first node ND1, between the first and second transistors Q31 and Q32, and the second node ND2, between the third and fourth transistors Q33 and Q34. The second capacitor C2 may be connected between the first terminal T1 of the battery device 200 and the ground terminal GND. Hereinafter, a balancing operation of the balancing circuit 130a is described in detail.

For example, when the voltage $V_{BAT1}$ of the first battery BAT1 is greater than the voltage $V_{BAT2}$ of the second battery BAT2, the first and third transistors Q31 and Q33 may be turned on and the second and fourth transistors Q32 and Q34 may be turned off. Thus, the first capacitor C1 is charged from the voltage $V_{BAT1}$ of the first battery BAT1. Next, when the first and third transistors Q31 and Q33 are turned off and the second and fourth transistors Q32 and Q34 are turned on, charges charged in the first capacitor C1 are transferred to the second battery BAT2.

For example, when the voltage $V_{BAT2}$ of the second battery BAT2 is greater than the voltage $V_{BAT1}$ of the first battery BAT1, the second and fourth transistors Q32 and Q34 may be turned on and the first and third transistors Q31 and Q33 may be turned off. Thus, the first capacitor C1 is charged from the voltage $V_{BAT2}$ of the second battery BAT2. Next, when the second and fourth transistors Q32 and Q34 are turned off and the first and third transistors Q31 and Q33 are turned on, the charges charged in the first capacitor C1 are transferred to the first battery BAT1.

The first through fourth transistors Q11 through Q14, the first and second transistors Q21 and Q22, and the first through fourth transistors Q31 through Q34 may be driven by a control logic. In an embodiment, the control logic may be implemented as a control logic 140 included in a charger IC 100' in FIG. 7. In an embodiment, the control logic may be implemented within a control block 160 included in an IF-PMIC 500 in FIG. 19. In an embodiment, the control logic may be implemented within a PMIC 300 or an AP 400 of FIG. 22.

Figure 14:
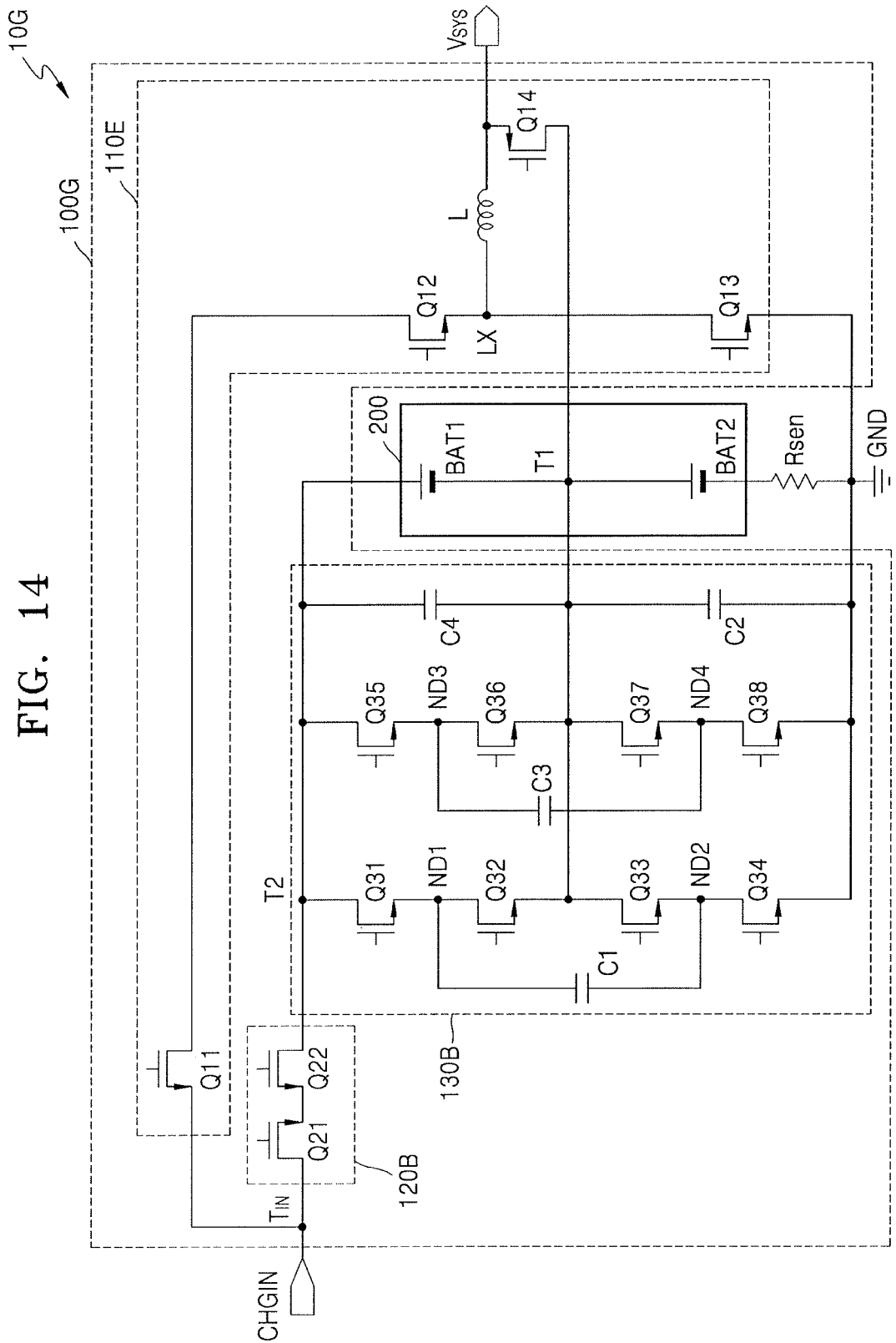

FIG. 14 is a circuit diagram illustrating a charger IC 100G in an electronic device 10G according to an embodiment. Referring to FIG. 14, the charger IC 100G may correspond to a modified example of the charger IC 100F of FIG. 13. The charger IC 100G may include a balancing circuit 130B that further includes fifth through eighth transistors Q35 through Q38, and third and fourth capacitors C3 and C4 as compared with the balancing circuit 130A in FIG. 13. However, in some embodiments, the balancing circuit 130B may not include the second capacitor C2 or the fourth capacitor C4. The fifth through eighth transistors Q35 through Q38 may be connected in series between the second terminal T2 of the battery device 200 and the ground terminal GND. The third capacitor C3 may be connected between a third node ND3, between the fifth and sixth transistors Q35 and Q36, and a fourth node ND4, between the seventh and eighth transistors Q37 and Q38. The fourth capacitor C4 may be connected between the first and second terminals T1 and T2 of the battery device 200.

Figure 15:
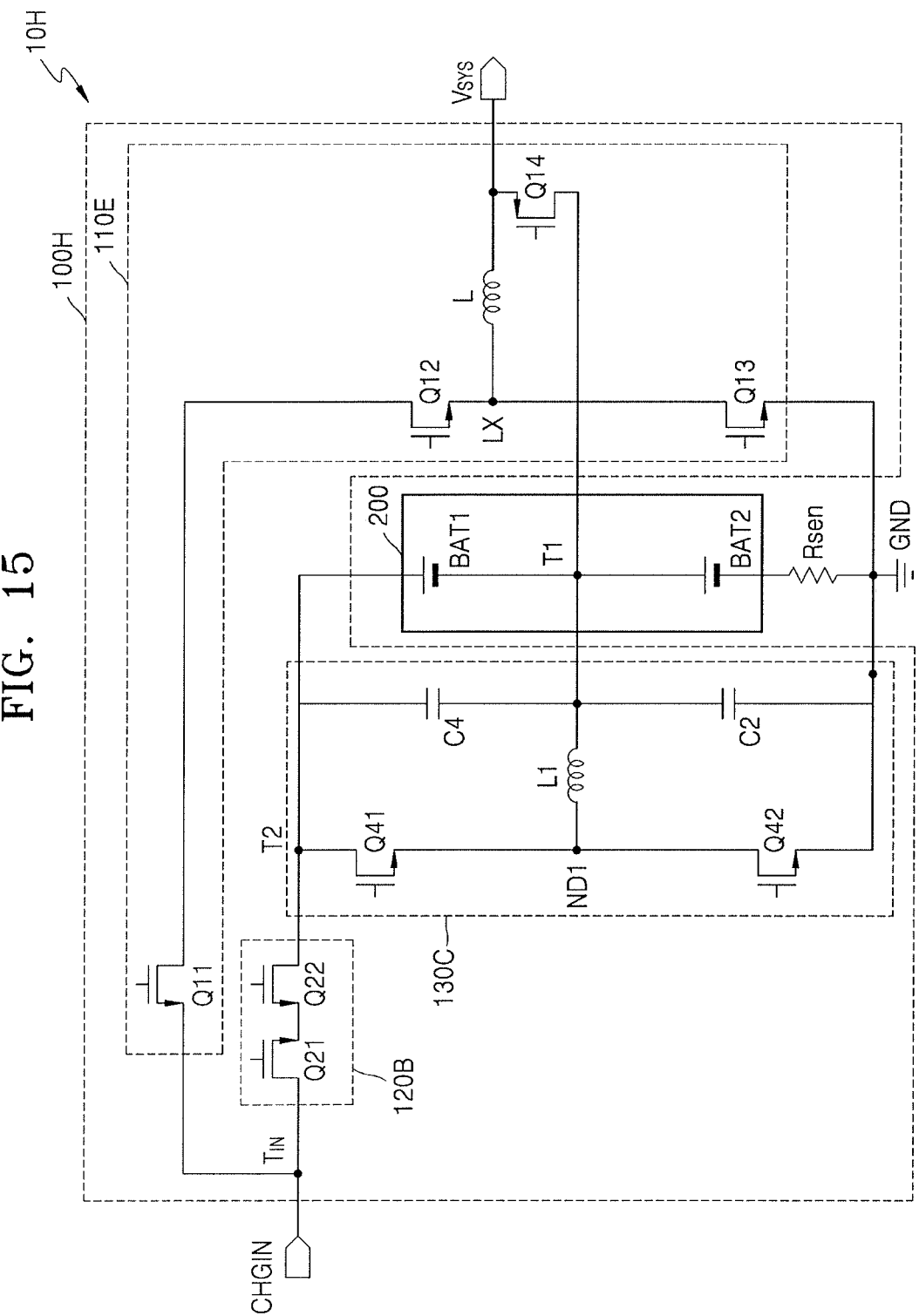

FIG. 15 is a circuit diagram illustrating a charger IC 100H in an electronic device 10H according to an embodiment. Referring to FIG. 15, the charger IC 100c may correspond to a modified example of the charger IC 100F of FIG. 13. The charger IC 100H may include a balancing circuit 130C that includes a first transistor Q41 and a second transistor Q42, a first inductor L1, and a second capacitor C2 and a fourth capacitor C4. The first and second transistors Q41 and Q42 may be connected in series between the second terminal T2 of the battery device 200 and the ground terminal GND. The first inductor L1 may be connected between the first node ND1 between the first transistor Q41 and the second transistor Q42, and the first terminal T1 of the battery device 200. The second capacitor C2 may be connected between the first terminal T1 and the ground terminal GND, and the fourth capacitor C4 may be connected between the second terminal T2 and the first terminal T1.

Figure 16:
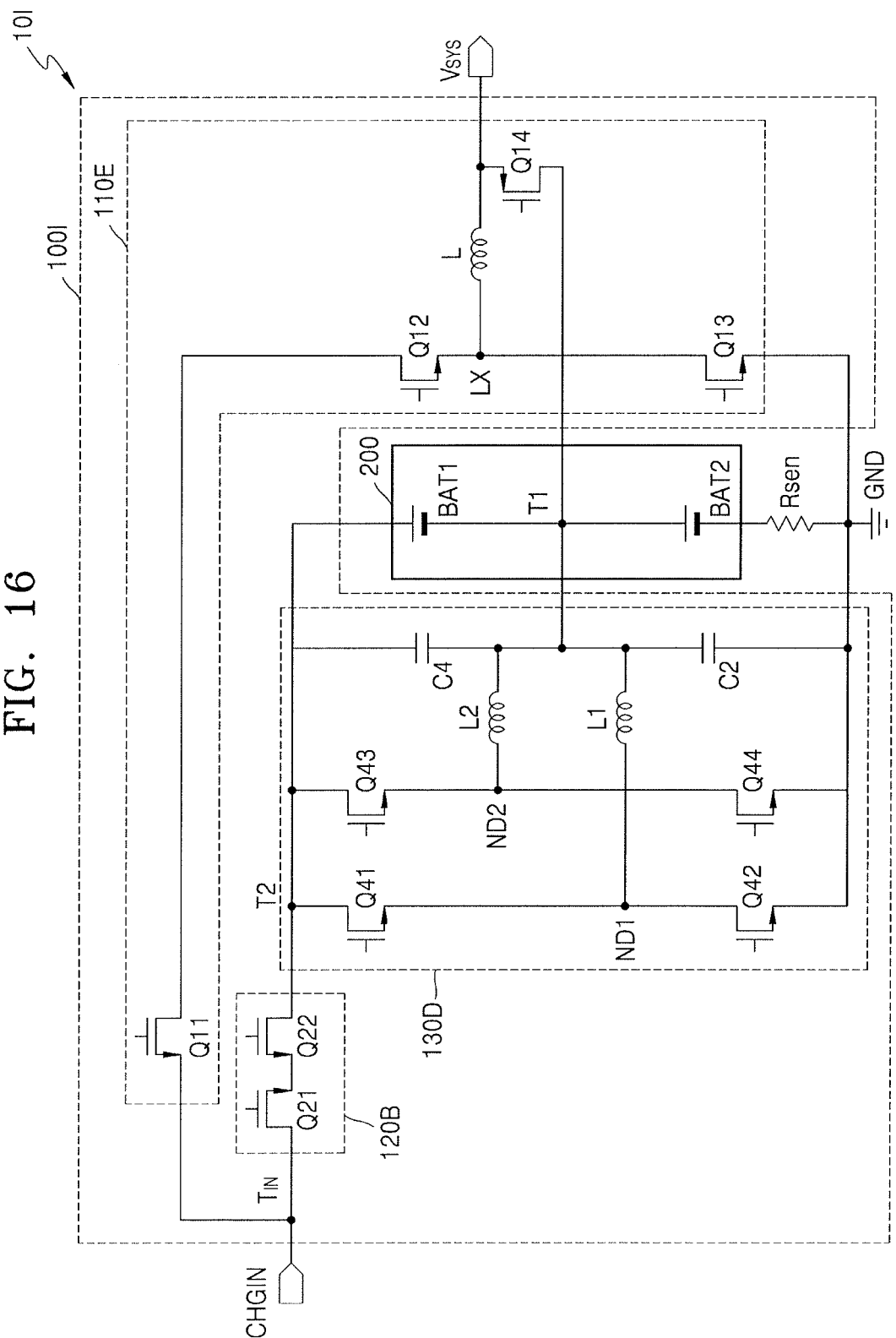

FIG. 16 is a circuit diagram illustrating a charger IC 100I in an electronic device 10I according to an embodiment. Referring to FIG. 16, the charger IC 100I may correspond to a modified example of the charger IC 100F of FIG. 15. The charger IC 100I may include a balancing circuit 130D that further includes a third transistor Q43 and a fourth transistor Q44, and a second inductor L2 as compared with the balancing circuit 130C in FIG. 15. The third and fourth transistors Q43 and Q44 may be connected in series between the second terminal T2 of the battery device 200 and the ground terminal GND. The second inductor L2 may be connected between the first node ND1 between the third and fourth transistors Q43 and Q44, and the first terminal T1 of the battery device 200.

Figure 17:
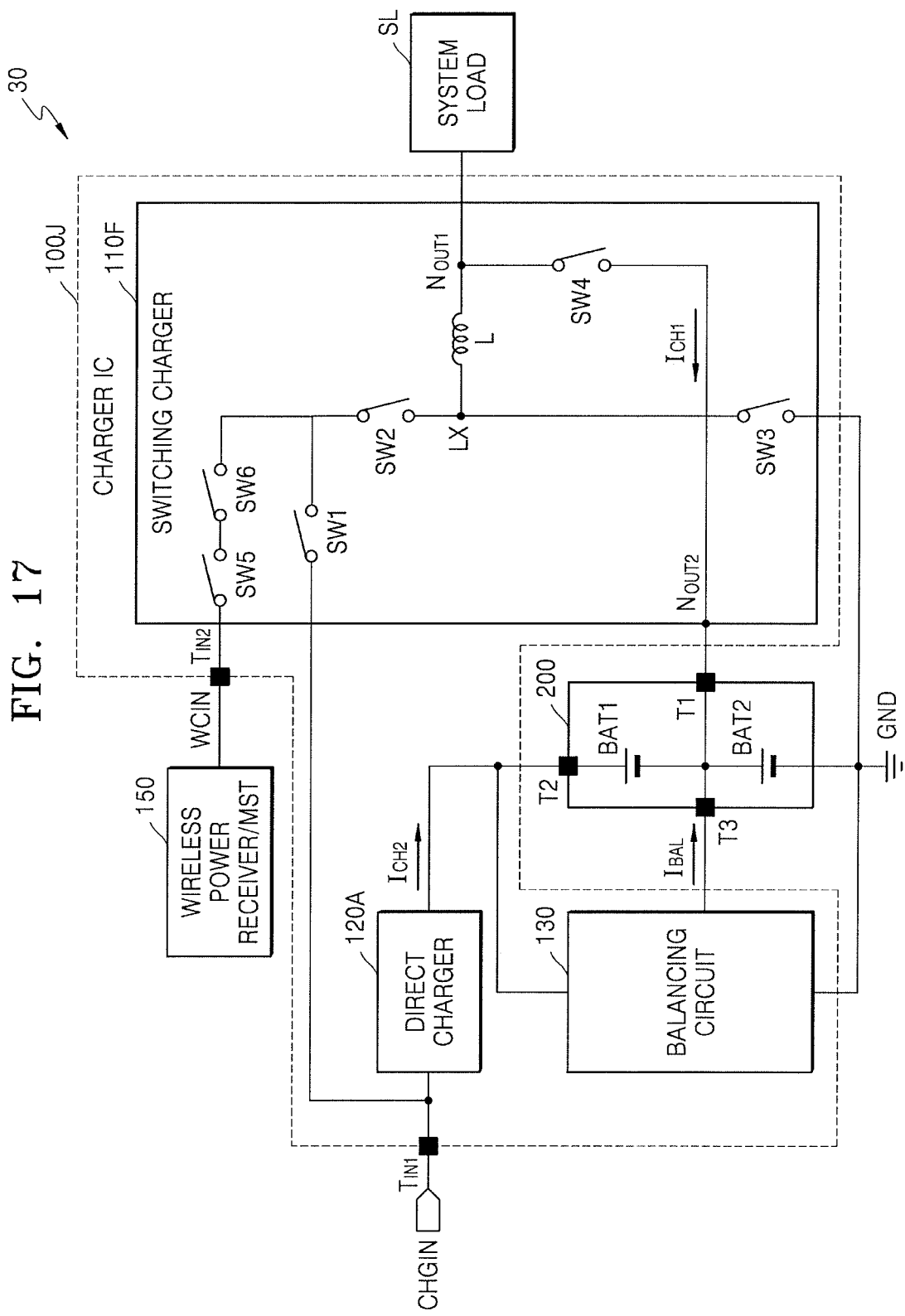
FIG. 17 illustrates an electronic device according to an embodiment.

FIG. 17 illustrates an electronic device 30 according to an embodiment. Referring to FIG. 17, the electronic device 30 may include a charger IC 100J, a wireless power receiver 150, the battery device 200, and the system load SL. The charger IC 100J may correspond to a modified example of the charger IC 100A in FIG. 2 and a switching charger 110F may further include a fifth switch SW5 and a sixth switch SW6. However, the switching charger 110F may further include only one of the fifth and sixth switches SW5 and SW6 as compared with the switching charger 110A in FIG. 2. In addition, the charger IC 100J may include the first input voltage terminal $T_{IN1}$ electrically connected to the TA and a second input voltage terminal $T_{IN2}$ electrically connected to the wireless power receiver 150.

The charger IC 100J may support a wired charge mode and a wireless charge mode. In the wired charge mode, the fifth and sixth switches SW5 and SW6 may be turned off, and the charger IC 100G may receive the input voltage CHGIN from the output terminal of TA via the first input voltage terminal $T_{IN1}$. In the first charge mode of the wire charge mode, the switching charger 110F may be activated and may provide the first charge current $I_{CH1}$ to the first terminal T1 of the battery device 200. In the first charge mode of the wire charge mode, the direct charger 120A may be activated and may provide the second charge current $I_{CH2}$ to the second terminal T2 of the battery device 200.

In the wireless charge mode, the first switch SW1 may be turned off, the direct charger 120A may be deactivated, and the fifth and sixth switches SW5 and SW6 may be turned on. Thus, the charger IC 100F may receive wireless power WCIN from the wireless power receiver 150 via the second input voltage terminal $T_{IN2}$. The wireless power receiver 150 may generate power according to a wireless charge method, e.g., one of various wireless charge methods such as magnetic induction, magnetic resonance, electromagnetic induction, non-radiative WiTricity, and so forth. For example, the wireless power receiver 150 may be implemented as a wireless rectifier.

In an embodiment, the wireless power receiver 150 may be implemented as a unit for both wireless charging and magnetic secure transmission (MST). In this case, the charger IC 100J may further support an MST mode. When the electronic device 30 containing credit card information directly or indirectly contacts a credit card payment terminal (for example, a point of sales (POS) terminal), the MDT technology may proceed with settlement while the credit card payment terminal automatically loads the credit card information embedded in the electronic device 30. With the MST technology, the credit card information may be transferred to the credit card payment terminal through a magnetic signal. In the MST mode, the first switch SW1 may be turned off, the direct charger 120A may be deactivated, and the charger IC 100F may be electrically connected to the wireless power receiver 150.

Figure 18A:
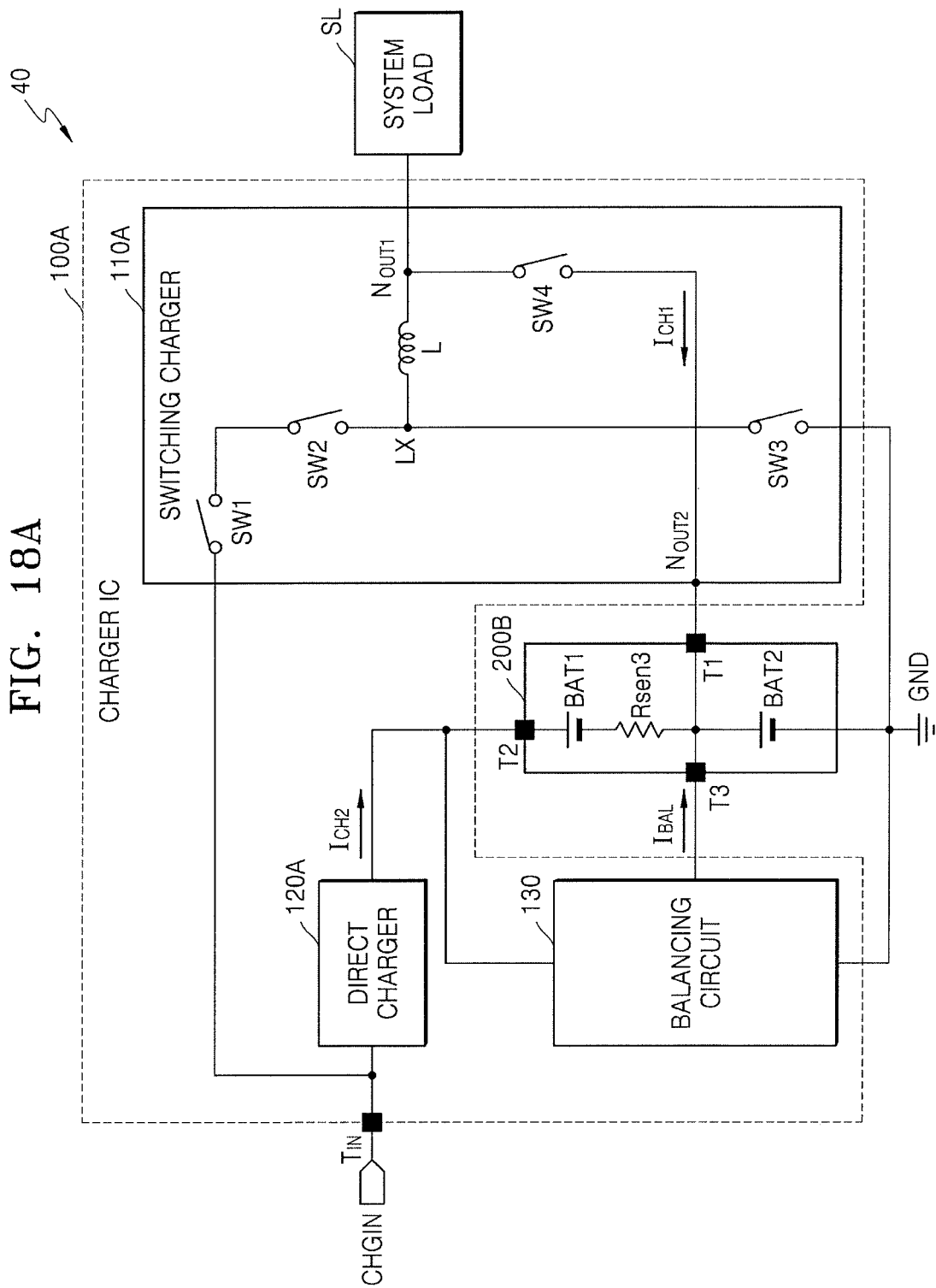
FIGS. 18A and 18B illustrate electronic devices according to embodiments, respectively.

FIG. 18A illustrates an electronic device 40 according to an embodiment. Referring to FIG. 18A, the electronic device 40 may include the charger IC 100A and the system load SL, and the electronic device 40 may be equipped with a battery device 200B. The battery device 200B may correspond to a modified example of the battery device 200 in FIG. 2 and may further include a third sense resistor Rsen3 as compared with the battery device 200. The battery device 200B may include the first battery BAT1 connected to the second terminal T2, the third sense resistor Rsen3 between the first battery BAT1 and the first terminal T1, and a second battery BAT2 between the terminal T1 and the ground terminal GND. However, in some embodiments, the third sense resistor Rsen3 may be between the second terminal T2 and the first battery BAT1.

In an embodiment, the battery device 200B may further include a sense terminal connected to a node between the first battery BAT1 and the third sense resistor Rsen3. A battery gauge (for example, 170 in FIG. 19) may be connected to the sense terminal and the first terminal, and thus, the first battery current flowing in the first battery BAT1 may be monitored. The electronic device 40 may control the operation of the charger IC 100A based on the first battery current.

Figure 18B:
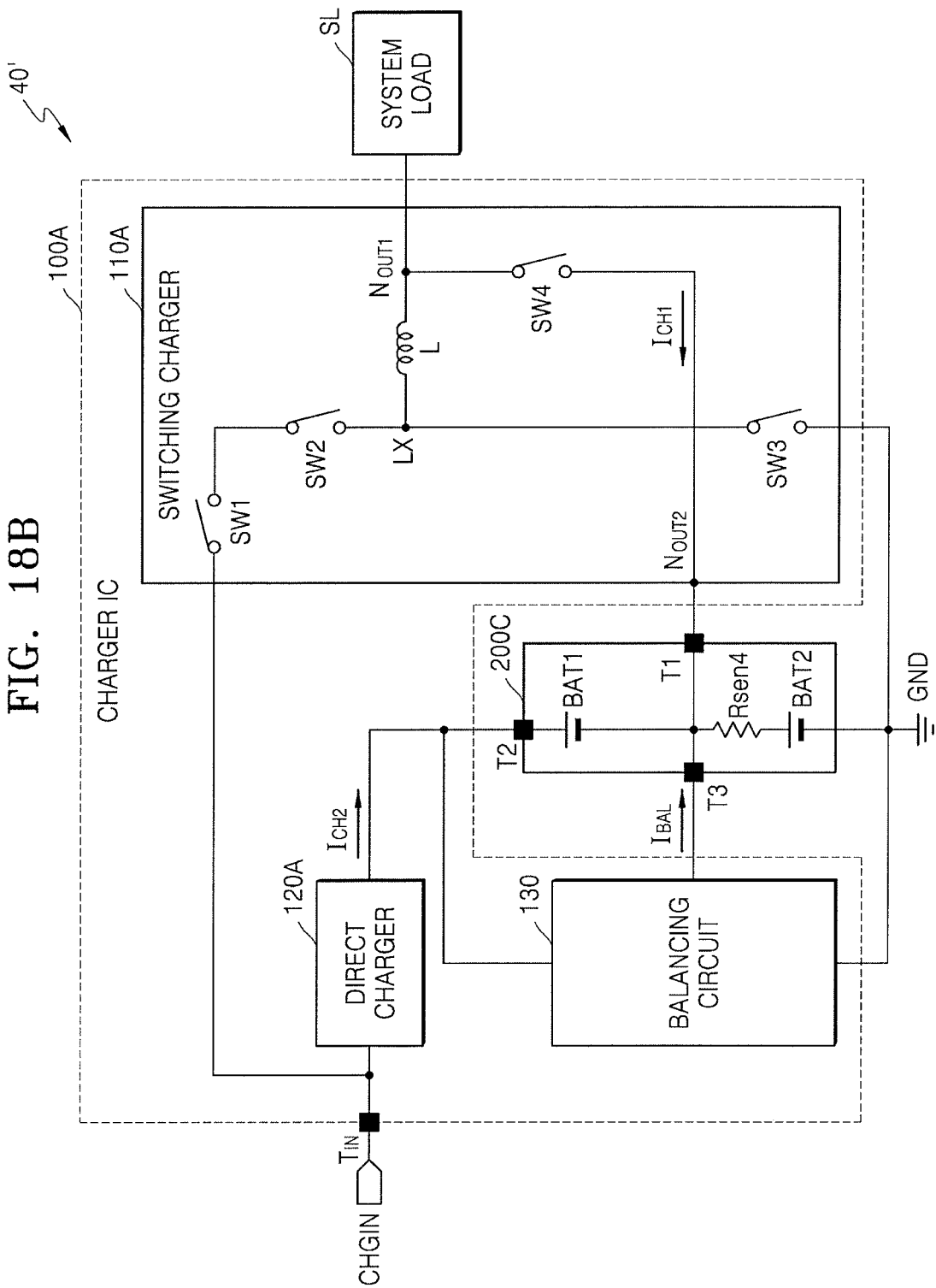

FIG. 18B illustrates an electronic device 40' according to an embodiment. Referring to FIG. 18B, the battery device 200C may be mounted on the electronic device 40'. The battery device 200C may correspond to a modified example of the battery device 200 in FIG. 2, and may further include a fourth sense resistor Rsen4 as compared with the battery device 200. The battery device 200C may include the first battery BAT1 connected between the second terminal T2 and the first terminal T1, the fourth sense resistor Rsen4 between the first terminal T1 and the second battery BAT2, and the second battery BAT2 between the fourth sense resistor Rsen4 and the ground terminal GND. However, in some embodiments, the fourth sense resistor Rsen4 may be between the second battery BAT2 and the ground terminal GND. In addition, in some embodiments, the battery device 200C may include both the third sense resistor Rsen3 in FIG. 18A and the fourth sense resistor Rsen4 in FIG. 18B.

In an embodiment, the battery device 200C may further include a sense terminal connected to a node between the fourth sense resistor Rsen4 and the second battery BAT2. A battery gauge (for example, 170 in FIG. 19) may be connected to the sense terminal and the first terminal, and thus, the second battery current flowing in the second battery BAT2 may be monitored. The electronic device 40' may control the operation of the charger IC 100A based on the second battery current.

Figure 19:
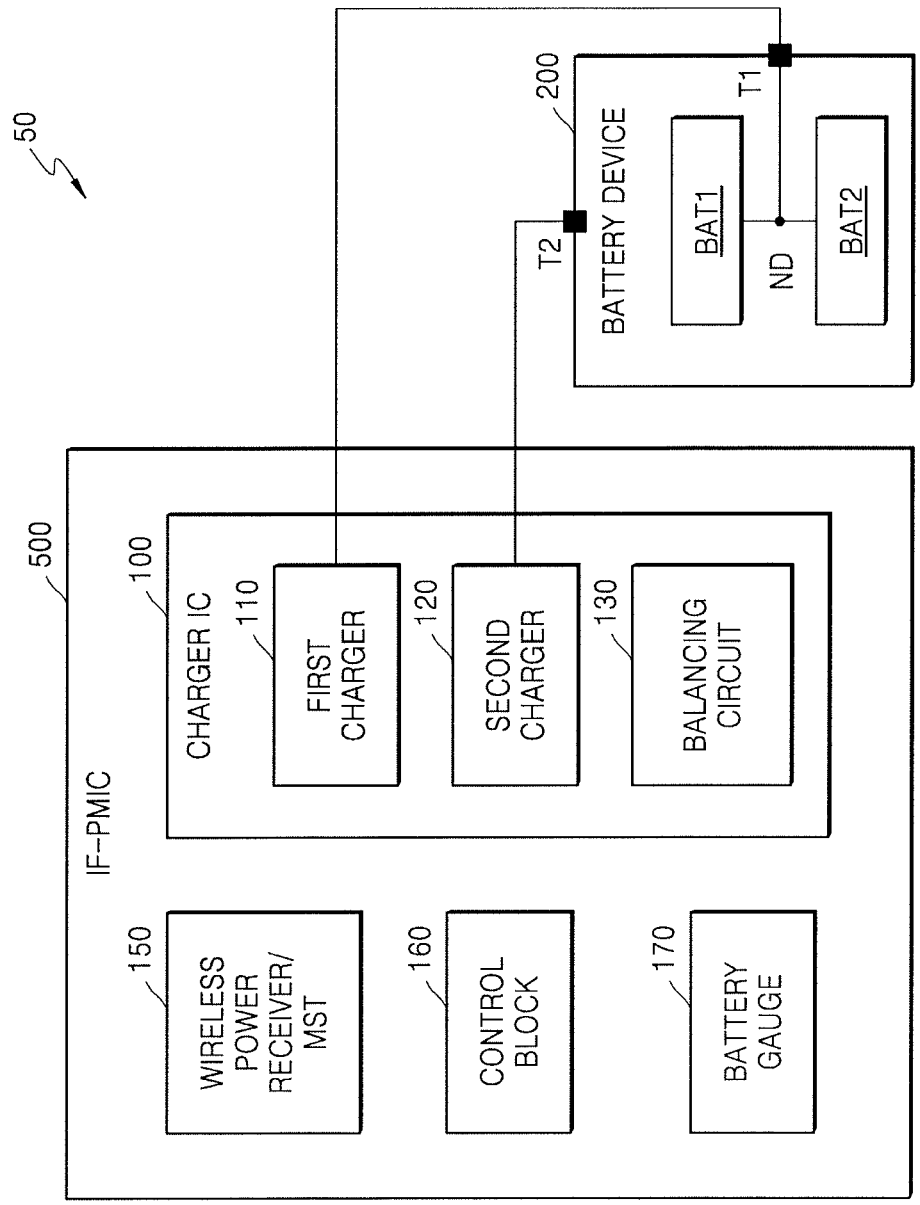
FIG. 19 illustrates an electronic device according to an embodiment.

FIG. 19 illustrates an electronic device 50 according to an embodiment.

Referring to FIG. 19, the electronic device 50 may include an IF-PMIC 500, and the battery device 200 may be part of the electronic device 50. The IF-PMIC 500 may include the charger IC 100, the wireless power receiver 150, the control block 160, and a battery gauge 170. The IF-PMIC 500 may further include a light-emitting diode (LED) driver, a universal serial bus (USB)-type C block, etc.

The wireless power receiver 150 may be implemented as the unit for both the wireless charging and MST. The control block 160 may control operations of the first and second chargers 110 and 120 and the balancing circuit 130. For example, the control block 160 may drive switches included in the first charger 110 and the second charger 120, and the balancing circuit 130 according to the first charge mode, the second charge mode, and a battery mode, respectively. In addition, the control block 160 may control the voltage level of the input voltage CHGIN. However, a function of the control block 160 may be performed in a micro controller unit (MCU) that may be outside the IF-PMIC 500.

The battery gauge 170 may monitor a remaining amount, voltage, current, temperature, etc., of the battery device 200. In an embodiment, the battery gauge 170 may be connected to at least one sense resistor which is connected to at least one of the first and second batteries BAT1 and BAT2 included in the battery device 200, and thus, may monitor a battery current flowing through at least one of the first and second batteries BAT1 and BAT2. However, the battery gauge 170 may be outside the IF-PMIC 500. In some embodiments, the battery gauge 170 may be included in the battery device 200.

Figure 20:
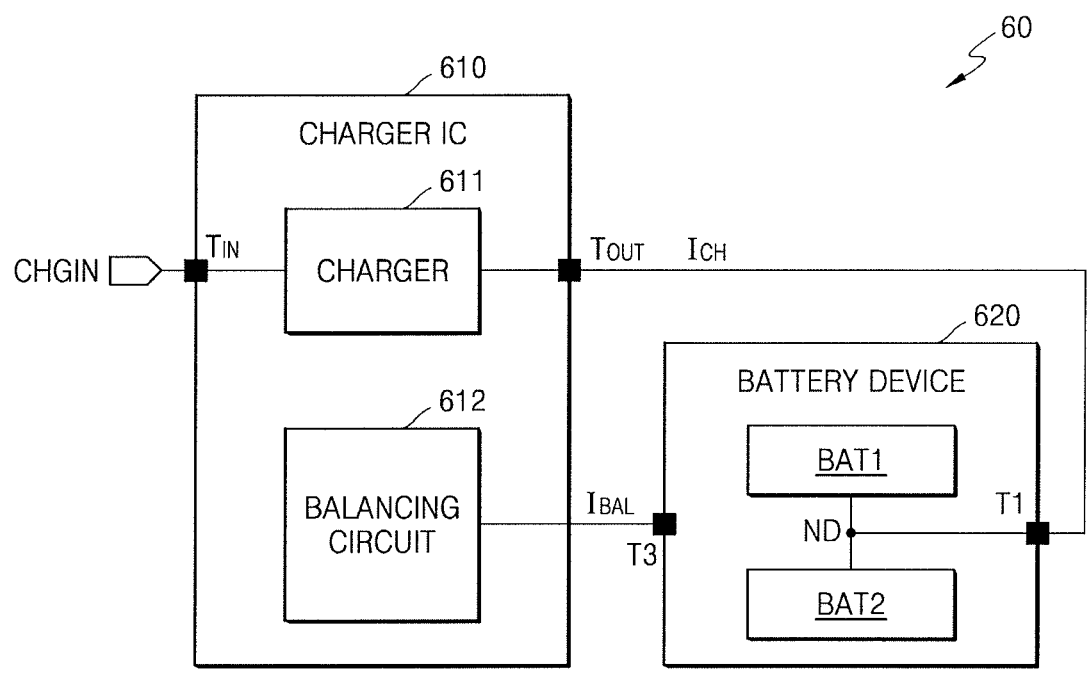
FIG. 20 illustrates an electronic device according to an embodiment.

FIG. 20 illustrates an electronic device 60 according to an embodiment. Referring to FIG. 20, the electronic device 60 may include a charger IC 610 and a battery device 620. The electronic device 60 may correspond to a modified example of the electronic device 10 of FIG. 1, and repeated descriptions thereof are omitted. The battery device 620 may include a first battery BAT1 and a second battery BAT2 connected to each other in series. The battery device 620 may further include the first terminal T1 connected to the connection node ND between the first battery BAT1 and the second battery BAT2.

The charger IC 610 may include a charger 611 and a balancing circuit 612. In addition, the charger IC 610 may further include the input voltage terminal $T_{IN}$ and an output terminal $T_{OUT}$. The input voltage terminal $T_{IN}$ may receive an input voltage CHGIN. The charger 611 may be connected between the input voltage terminal $T_{IN}$ and the output terminal $T_{OUT}$, and the output terminal $T_{OUT}$ may be electrically connected to the first terminal T1 of the battery device 620. The charger 611 may receive the input voltage CHGIN from the input voltage terminal $T_{IN}$ and generate a charge current $I_{CH}$ by using the received input voltage CHGIN. The charger 611 may provide the charge current $I_{CH}$ to the first terminal T1 of the battery device 620 via the output terminal $T_{OUT}$. The charger 611 may include at least one of the first and second chargers disclosed above.

The balancing circuit 612 may balance a voltage of the first battery BAT1 and that of the second battery BAT2. The balancing circuit 612 may provide the balancing current $I_{BAL}$ to the battery device 620 to balance the voltage of the first battery BAT1 and the voltage of the second battery BAT2. In some embodiments, the battery device 620 may further include the third terminal T3, and the balancing circuit 612 may be connected to the battery device 620 via the third terminal T3. In an embodiment, the third terminal T3 may be electrically connected to the connection node ND.

Figure 21:
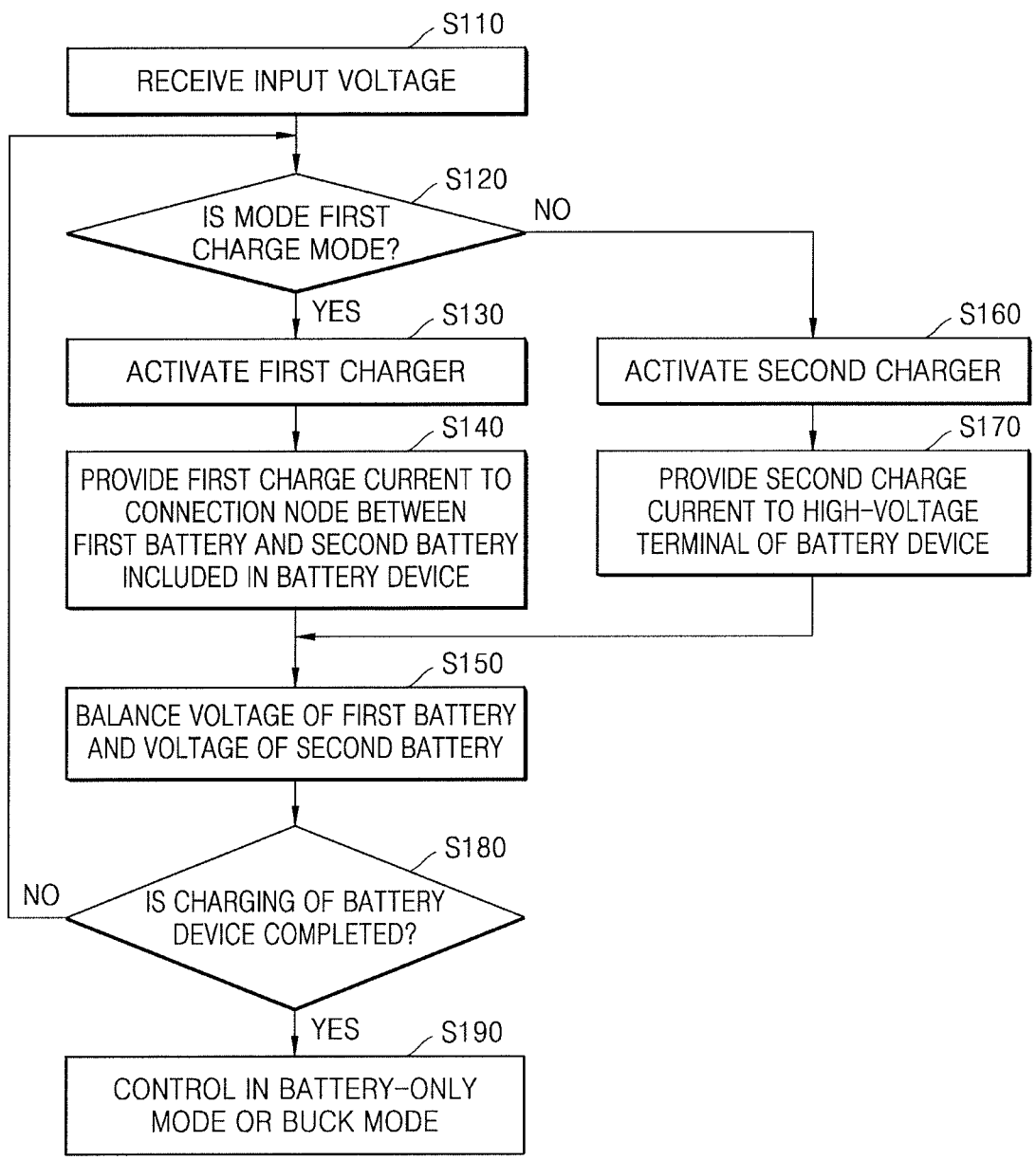
FIG. 21 illustrates a flowchart of a charge control method according to an embodiment.

FIG. 21 is a flowchart of a charge control method according to an embodiment. Referring to FIG. 21, the charge control method may include, for example, operations performed in a time series in the charger IC 100 in FIG. 1. The descriptions given above with reference to FIGS. 1 through 20 may also be applied to the present embodiment, and repeated descriptions thereof are omitted.

An input voltage may be received (S110). For example, the charger IC 100 may receive the input voltage CHGIN via the input voltage terminal $T_{IN}$. For example, an electronic device may be connected to the TA, and thus, operation S110 may be performed.

Whether a mode is a first charge mode may be determined (S120). For example, the first charge mode may be a normal charge mode. For example, the input voltage CHGIN received via the input voltage terminal $T_{IN}$ in the first charge mode may be a low voltage. For example, the control logic in the charger IC 100, the control block in the IF-PMIC, the control block in the PMIC, the MCU, or the application processor may determine whether the mode is the first charge mode. As a result of the determination, when the mode is the first charge mode, operation S130 may be performed and, when, the mode is not the first charge mode, operation S160 may be performed.

When in the first charge mode, the charger IC 100 may activate the first charger 110 (S130). For example, the first through fourth switches SW1 through SW4 in the switching charger (110A in FIG. 2) may be turned on. The first charger 110 may provide the first charge current $I_{CH1}$ to the connection node T1 between the first battery BAT1 and the second battery BAT2 included in the battery device 200 (S140). The balancing circuit 130 may balance the voltage of the first battery BAT1 and the voltage of the second battery BAT2 (S150).

When in the second charge mode, and the charger IC 100 may activate the second charger 120 (S160). For example, the second charge mode may be a fast charge mode. For example, the input voltage CHGIN received via the input voltage terminal $T_{IN}$ in the second charge mode may be a high voltage, and a voltage level of the input voltage CHGIN may be adjustable. For example, the first and second transistors Q21 and Q22 included in the direct charger (120F in FIG. 13) may be turned on. The second charger 120 may provide the second charge current $I_{CH2}$ to the high voltage terminal T2 of the battery device 200 (S170).

Whether charging of the battery device 200 is completed may be determined (S180). As a result of the determination, when the battery device 200 is fully charged, operation S190 may be performed. Otherwise, operation S120 may again be performed. The charger IC 100 may operate in the battery-only mode or the buck mode (S190). For example, in the battery-only mode, the system current $I_{SYS}$ may be supplied from the battery device 200 to the system load SL. For example, in the case of the buck mode, the system current $I_{SYS}$ from the input voltage CHGIN may be provided to the system load SL via the first charger 110.

Figure 22:
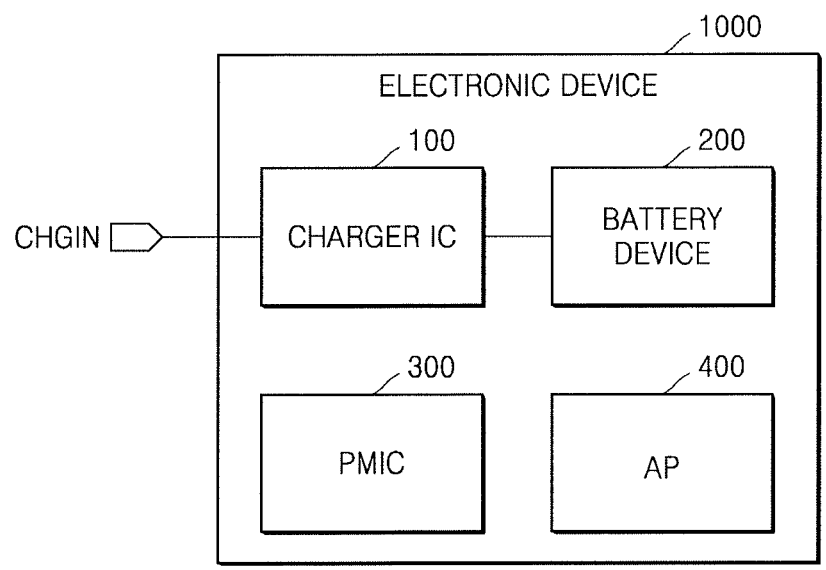
FIG. 22 illustrates an electronic device according to an embodiment.

FIG. 22 illustrates an electronic device 1000 according to an embodiment. Referring to FIG. 22, the electronic device 1000 may include the charger IC 100, the battery device 200, the PMIC 300, and the AP 400. The electronic device 1000 may include the charger IC 100 for receiving power from the outside and for charging the battery device 200. The charger IC 100 may be implemented according to various embodiments illustrated in FIGS. 1 through 21.

The PMIC 300 may receive the battery voltage and manage the power required for driving the AP 400. In addition, the PMIC 300 may be implemented to generate or manage voltages required for internal components of the electronic device 1000. According to embodiments, the electronic device 1000 may include a plurality of PMICs each including the PMIC 300. In an embodiment, the PMIC 300 may receive the battery voltage from the battery device 200. In an embodiment, the PMIC 300 may receive a system voltage via the charger IC 100. In an embodiment, the PMIC 300 may directly receive the input voltage CHGIN.

The AP 400 may control the entirety of the electronic device 1000. In an embodiment, the AP 400 may control the charger IC 100, and may control the charger IC 100, e.g., in the first charge mode, the second charge mode, or the battery-only mode. In an embodiment, when the electronic device 1000 is connected to the TA, the AP 400 may communicate with the TA and adjust the input voltage CHGIN output from the TA. In an embodiment, the AP 400 may be implemented as a system-on-chip (SOC) that includes one or more IP blocks.

According to one or more embodiments, a charger integrated circuit may support both a high voltage charge and a low voltage charge for a battery device by including both a first charger and a second charger which are activated in different charge modes, respectively. Heat generation of an electronic device may be reduced and charge time for the battery device may be decreased by charging the battery device by using a direct charger during a high-speed charge, e.g., a high-voltage charge.

In addition, by charging the battery device by using a switching charger or a linear charger during a normal charge mode such as a low voltage charging, a system voltage supplied to a system load may be stably supplied. Furthermore, an effective use capacity of a battery may be a sum of capacities of serially-connected batteries while maintaining the battery voltage supplied to the system load. Thus, a battery usage time may be increased.

One or more embodiments provide a charger integrated circuit (IC) capable of supporting both high voltage charging and low voltage charging and stably providing a system power source to a battery device, and an electronic device including the charger IC.

Embodiments are described, and illustrated in the drawings, in terms of functional blocks, units, modules, and/or methods. Those skilled in the art will appreciate that these blocks, units, modules, and/or methods are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units, modules, and/or methods being implemented by microprocessors or similar, they may be programmed using software (e.g., microcode) to perform various functions discussed herein and may optionally be driven by firmware and/or software. Alternatively, each block, unit, module, and/or method may be implemented by dedicated hardware, or as a combination of dedicated hardware to perform some functions and a processor (e.g., one or more programmed microprocessors and associated circuitry) to perform other functions. Also, each block, unit, and/or module of the embodiments may be physically separated into two or more interacting and discrete blocks, units and/or modules without departing from the scope of the disclosure. Further, the blocks, units and/or modules of the embodiments may be physically combined into more complex blocks, units and/or modules without departing from the scope of the disclosure.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A charger integrated circuit (IC) for charging a battery device including a first battery and a second battery connected to each other in series, the charger IC comprising:
    a first charger to be connected to a connection node between the first battery and the second battery, the first charger to provide a first charge current to the connection node using an input voltage received from an input voltage terminal in a first charge mode; and
    a second charger to be connected between the input voltage terminal and a high voltage terminal of the battery device, the second charger to directly charge the battery device by providing a second charge current to the high voltage terminal using the input voltage received from the input voltage terminal in a second charge mode,
    wherein the first charge mode corresponds to a normal charge mode, the second charger is deactivated in the first charge mode, the second charge mode corresponds to a high speed charge mode, and the first charger is deactivated in the second charge mode.

2. The charger IC as claimed in claim 1, wherein the first battery includes a first battery cell, the second battery includes a second battery cell, and the battery device includes a multi-cell battery.

3. The charger IC as claimed in claim 1, wherein the first charger includes a switching charger.

4. The charger IC as claimed in claim 3, wherein the switching charger includes:
    a first switch, a second switch, and a third switch connected to each other in series between the input voltage terminal and a ground terminal;
    an inductor connected between a switching node, between the second switch and the third switch, and a first output node; and
    a fourth switch connected between the first output node and a second output node, wherein the first output node is electrically connected to a system load and the second output node is electrically connected to the connection node.

5. The charger IC as claimed in claim 3, wherein the switching charger includes:
    a first switch, a second switch, and a third switch connected to each other in series between the input voltage terminal and a ground terminal;
    an inductor connected between a switching node, between the second switch and the third switch, and a first output node; and
    a resistor connected between the first output node and a second output node, wherein the first output node is electrically connected to a system load and the second output node is electrically connected to the connection node.

6. The charger IC as claimed in claim 3, wherein the switching charger includes:
    a first switch, a second switch, and a third switch connected to each other in series between the input voltage terminal and a ground terminal; and
    an inductor connected between a switching node, between the second switch and the third switch, and a first output node, wherein the first output node is electrically connected to a system load and the connection node.

7. The charger IC as claimed in claim 1, wherein the first charger includes a linear charger.

8. The charger IC as claimed in claim 1, wherein the second charger includes a direct charger having at least one switch connected between the input voltage terminal and the high voltage terminal.

9. The charger IC as claimed in claim 1, further comprising at least one sense resistor connected in series to at least one of the first and second batteries.

10. The charger IC as claimed in claim 9, wherein the at least one sense resistor includes at least one of a first sense resistor connected between the second charger and the first battery, and a second sense resistor connected between the second battery and a ground terminal.

11. The charger IC as claimed in claim 1, wherein the battery device further includes a third battery connected to the first and second batteries in series, and the high voltage terminal of the battery device is connected to the third battery.

12. The charger IC as claimed in claim 1, further comprising:
    a balancing circuit electrically connected to the battery device, the balancing circuit to balance voltages of the first and second batteries: and a control logic to control at least one of the balancing circuit, the input voltage, and the first and second chargers.

13. The charger IC as claimed in claim 1, further comprising a wireless power receiver to transfer wireless power to the first charger, wherein:
   the first charger includes a first input node connected to the input voltage terminal and a second input node connected to the wireless power receiver, and
   the first charger is to receive the input voltage via the first input node in the first charge mode and receive the wireless power via the second input node in a wireless charge mode.

14. An electronic device, comprising:
   a charger integrated circuit (IC) to charge a battery device including a first battery and a second battery which are connected to each other in series; and
   at least one sense resistor arranged outside of the charger IC, the at least one sense resistor being connected in series to at least one of the first and second batteries,
   wherein the charger IC includes:
      a first charger to be connected to a connection node between the first battery and the second battery, the first charger to provide a first charge current to the connection node in a first charge mode; and
      a second charger connected between the input voltage terminal and a high voltage terminal of the battery device, the second charger to directly charge the battery device by providing a second charge current to the high voltage terminal using the input voltage received from the input voltage terminal in a second charge mode,
      wherein the second charger includes a direct charger having at least one switch connected between the input voltage terminal and the high voltage terminal.

15. The electronic device as claimed in claim 14, wherein the charger IC further includes a balancing circuit electrically connected to the battery device, the balancing circuit to balance voltages of the first and second batteries.

16. An electronic device, comprising:
   a battery device including a first battery and a second battery which are connected to each other in series, a connection node between the first battery and the second battery, and a high voltage terminal connected to the first battery; and
   a charger integrated circuit (IC) to charge the battery device, the charger IC including:
      a first charger to be connected to the connection node, the first charger to provide a first charge current to the connection node in a first charge mode; and
      a second charger to be connected to the high voltage terminal, the second charger to directly charge the battery device by providing a second charge current to the high voltage terminal in a second charge mode,
      wherein the first charge mode corresponds to a normal charge mode, the second charger is deactivated in the first charge mode, the second charge mode corresponds to a high speed charge mode, and the first charger is deactivated in the second charge mode.

17. The electronic device as claimed in claim 16, wherein the charger IC further includes a balancing circuit to be electrically connected to the battery device, to balance voltages of the first and second batteries.

18. The electronic device as claimed in claim 16, further comprising at least one sense resistor connected in series to at least one of the first and second batteries.

19. The electronic device as claimed in claim 16, further comprising a wireless power receiver to transfer wireless power to the first charger, wherein:
   the first charger includes a first input node connected to an input voltage terminal and a second input node connected to the wireless power receiver, and
   the first charger is to receive an input voltage via the first input node in the first charge node and receive the wireless power via the second input node in a wireless charge mode.

20. The electronic device as claimed in claim 14, wherein the first charge mode corresponds to a normal charge mode, the second charger is deactivated in the first charge mode, the second charge mode corresponds to a high speed charge mode, and the first charger is deactivated in the second charge mode.

* * * * *